(12) United States Patent
Hoppe et al.

(10) Patent No.: US 9,858,965 B2
(45) Date of Patent: Jan. 2, 2018

(54) VIDEO LOOP GENERATION

(71) Applicant: Microsoft Technology Licensing, LLC, Redmond, WA (US)

(72) Inventors: Hugues Herve Hoppe, Redmond, WA (US); Jing Liao, Hong Kong (HK); Mark Thomas Finch, III, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 156 days.

(21) Appl. No.: 14/922,080

(22) Filed: Oct. 23, 2015

(65) Prior Publication Data

US 2017/0117016 A1    Apr. 27, 2017

(51) Int. Cl.
*H04N 5/93* (2006.01)
*G11B 27/00* (2006.01)
*G11B 27/10* (2006.01)
*G11B 27/031* (2006.01)

(52) U.S. Cl.
CPC .......... *G11B 27/007* (2013.01); *G11B 27/031* (2013.01); *G11B 27/10* (2013.01)

(58) Field of Classification Search
USPC .................................................. 386/278, 280
See application file for complete search history.

(56) References Cited

U.S. PATENT DOCUMENTS

| | | | |
|---|---|---|---|
| 5,877,445 | A | 3/1999 | Hufford et al. |
| 6,600,491 | B1 | 7/2003 | Szeliski et al. |
| 6,636,220 | B1 | 10/2003 | Szeliski et al. |
| 7,912,337 | B2 | 3/2011 | Souchard |
| 8,301,669 | B2 | 10/2012 | O'Brien-Strain et al. |
| 8,594,460 | B2 | 11/2013 | Lindskog et al. |
| 9,082,198 | B2 | 7/2015 | Mashiah |
| 2005/0086027 | A1 | 4/2005 | Li et al. |

(Continued)

FOREIGN PATENT DOCUMENTS

| | | |
|---|---|---|
| EP | 2852143 A1 | 3/2015 |
| WO | 2008099406 A2 | 8/2008 |
| WO | 2014179636 A1 | 11/2014 |

OTHER PUBLICATIONS

"International Search Report and Written Opinion for PCT Patent Application No. PCT/US2016/056703", dated Apr. 13, 2017, 25 pages.

(Continued)

*Primary Examiner* — Nigar Chowdhury
(74) *Attorney, Agent, or Firm* — Medley, Behrens & Lewis, LLC

(57) ABSTRACT

Various technologies described herein pertain to generating an output video loop from an input video that includes values at pixels over a time range. Respective input time intervals within the time range of the input video are determined for the pixels by performing an optimization. The optimization can be performed to assign the input time intervals at a first level of resolution, while terms of an objective function use a finer, second level of resolution. An input time interval for a particular pixel includes a per-pixel loop period of a single, contiguous loop at the particular pixel within the time range from the input video. The input time intervals can be temporally scaled based on per-pixel loop periods and an output video loop period. The output video loop is created based on the values at the pixels over the input time intervals for the pixels in the input video.

20 Claims, 13 Drawing Sheets

(56) References Cited

U.S. PATENT DOCUMENTS

2008/0001950 A1    1/2008   Lin et al.
2014/0327680 A1   11/2014   Hoppe et al.

OTHER PUBLICATIONS

Wang, et al., "Videoshop: a new framework for spatio-temporal video editing in gradient domain", In Proceedings of IEEE Computer Society Conference on Computer Vision and Pattern Recognition, vol. 2, Jun. 20, 2005, 1 page.
Rüegg, et al., "DuctTake: Spatiotemporal Video Compositing", In Proceedings of Computer Graphics Forum, vol. 32, Issue 2, May 7, 2013, 11 pages.
Wang, et al., "Seamless Video Editing" In Proceedings of the 17th International Conference on Pattern Recognition, Aug. 2004, 6 pages.
Tompkin, et al., "Towards Moment Imagery: Automatic Cinemagraphs", In Proceedings of Conference for Visual Media Production, Nov. 16, 2011, pp. 87-93.
Yeh, et al., "An Approach to Automatic Creation of Cinemagraphs", In Proceedings of the 20th ACM international conference on Multimedia, Oct. 29, 2012, pp. 1153-1156.
Wang, Brian., "Poisson Blending", Published on: Nov. 2, 2012, Available at: <<http://web.engr.illinois.edu/~bwang8/cs498dwh/proj3/>>, 4 pages.
Chen, et al., "Motion-Aware Gradient Domain Video Composition", In Proceedings of IEEE Transactions on Image Processing vol. 22, Issue 7, Mar. 7, 2013, pp. 1-13.
"How do I make seamless loop video from an existing short video?", Retrieved on: Aug. 10, 2015, Available at: <<http://www.quora.com/How-do-I-make-seamless-loop-video-from-an-existing-short-video>>, 3 pages.
Guo, et al., "Mesh-Guided Optimized Retexturing for Image and Video", In Proceedings of IEEE Transactions on Visualization and Computer Graphics, vol. 14, Issue 2, Mar. 2008, pp. 426-439.
Zulko, "An Algorithm to Extract Looping GIFs from Videos", Published on: Feb. 1, 2015, Available at: <<http://zulko.github.io/blog/2015/02/01/extracting-perfectly-looping-gifs-from-videos-with-python-and-moviepy/>>, 20 pages.
Liao, et al., "Automated Video Looping with Progressive Dynamism", In Journal of ACM Transactions on Graphics, vol. 34, Issue 4, Jul. 21, 2013, 10 pages.
Agarwala, et al., "Interactive Digital Photomontage", In Journal of ACM Transactions on Graphics, vol. 23, Issue 3, Aug. 8, 2004, pp. 294-302.
Agarwala, et al., "Panoramic Video Textures", In Journal of ACM Transactions on Graphics, vol. 24, Issue 3, Jul. 31, 2005, pp. 821-827.
Bai, et al., "Selectively De-Animating Video", In Journal of ACM Transactions on Graphics, vol. 31, Issue 4, Jul. 2012, 10 pages.
Beck, et al., "Cinemagraphs", Retrieved on: Aug. 17, 2015, Available at: <<http://cinemagraphs.com/>>, 1 page.
Bennett, et al., "Computational Time-Lapse Video", In Journal of ACM Transactions on Graphics, vol. 26, Issue 3, Jul. 2007, 6 pages.
Boykov, et al., "Fast Approximate Energy Minimization via Graph Cuts", In Journal of IEEE Transactions on Pattern Analysis and Machine Intelligence, vol. 23, Issue 11, Nov. 2001, pp. 1222-1239.
Burt, et al., "A Multiresolution Spline with Application to Image Mosaics", In Journal of ACM Transactions on Graphics, vol. 2, Issue 4, Oct. 1983, pp. 217-236.
Cho, et al., "A Content-Aware Image Prior", In Proceedings of IEEE Conference on Computer Vision and Pattern Recognition, Jun. 13, 2010, 8 pages.
Chuang, et al., "Animating Pictures with Stochastic Motion Textures", In Journal of ACM Transactions on Graphics, vol. 24, Issue 3, Jul. 2005, pp. 853-860.
Cohen, et al., "The Moment Camera", In Journal of IEEE Computer Society, vol. 39, Issue 8, Aug. 2006, pp. 40-45.
Couture, et al., "Panoramic Stereo Video Textures", In Proceedings of IEEE International Conference on Computer Vision, Nov. 6, 2011, pp. 1251-1258.
Freeman, et al., "Motion without Movement", In Proceedings of 18th Annual Conference on Computer Graphics and Interactive Techniques, Jul. 28, 1991, pp. 27-30.
Horn, et al., "Determining Optical Flow", In Journal of Artificial Intelligence, vol. 17, Issues 1-3, Aug. 1981, pp. 185-203.
Joshi, et al., "Cliplets: Juxtaposing Still and Dynamic Imagery", In Proceedings of 25th Annual ACM Symposium on User Interface Software and Technology, Oct. 7, 2012, pp. 251-260.
Kolmogorov, et al., "What Energy Functions Can Be Minimized via Graph Cuts?", In Proceedings of IEEE Transactions on Pattern Analysis and Machine Intelligence, vol. 26, Issue 2, Feb. 2004, pp. 147-159.
Kwatra, et al., "Graphcut Textures: Image and Video Synthesis Using Graph Cuts", In Journal of ACM Transactions on Graphics, vol. 22 Issue 3, Jul. 2003, pp. 277-286.
Liu, et al., "Motion Magnification", In Journals of ACM Transactions on Graphics, vol. 24, Issue 3, Jul. 2005, 8 pages.
Mahajan, et al., "Moving Gradients: A Path-Based Method for Plausible Image Interpolation", In Journals of ACM Transactions on Graphics, vol. 28, Issue 3, Aug. 2009, 12 pages.
Marks, et al., "Design Galleries: A General Approach to Setting Parameters for Computer Graphics and Animation", In Proceedings of the 24th annual conference on Computer graphics and interactive techniques, Aug. 3, 1997, 12 pages.
Pritch, et al., "Nonchronological Video Synopsis and Indexing", In Proceedings of IEEE Transactions on Pattern Analysis and Machine Intelligence, vol. 30, Issue 11, Nov. 2008, pp. 1971-1984.
Rav-Acha, et al., "Dynamosaicing: Mosaicing of Dynamic Scenes", In Proceedings of IEEE Transactions on Pattern Analysis and Machine Intelligence, vol. 29, Issue 10, Oct. 2007, pp. 1789-1801.
Schodl, et, al. "Video Textures", In Proceedings of the 27th annual conference on Computer graphics and interactive techniques, Jul. 2000, 11 pages.
Sunkavalli, et al., "Factored Time-Lapse Video", In Journal of ACM Transactions on Graphics, vol. 26 Issue 3, Jul. 2007, 10 pages.
Jenkins, Steve, "Create Cinemagraph Animated Gifs from Video", Retrieved at <<http://www.webdesignermag.co.uk/tutorials/create-cinemagraph-animated-gifs-from-video/>>, Dec. 26, 2011, pp. 1-15.
Wang, et al., "Interactive Video Cutout", In journal of ACM Transactions on Graphics, vol. 24, Issue 3, Jul. 2005, pp. 585-594.
Wu, et al., "Eulerian Video Magnification for Revealing Subtle Changes in the World", In journal of ACM Transactions on Graphics, vol. 31, Issue 4, Jul. 2012, 8 pages.
Agarwala, Aseem, "Efficient Gradient-Domain Compositing Using Quadtrees", In journal of ACM Transactions on Graphics, vol. 26, Issue 3, Jul. 2007, 6 pages.
Ashikhmin, Michael, "Synthesizing Natural Textures", In Proceedings of the Symposium on Interactive 3D Graphics, Mar. 1, 2001, pp. 217-226.
Bai, et al., "Automatic Cinemagraph Portraits", In Proceedings of the Eurographics Symposium on Rendering, vol. 32, No. 4, Jun. 19, 2013, 9 pages.
Bhat, et al., "Fourier Analysis of the 2D Screened Poisson Equation for Gradient Domain Problems", In Proceedings of the 10th European Conference on Computer Vision: Part II, Oct. 12, 2008, pp. 1-14.
Liu, et al., "Parallel Graph-Cuts by Adaptive Bottom-Up Merging", In Proceedings of IEEE Conference on Computer Vision and Pattern Recognition, Jun. 13, 2010, 8 pages.
Perez, et al., "Poisson Image Editing", In Journal ACM Transactions on Graphics, vol. 22, Issue 3, Jul. 2003, pp. 313-318.
Sevilla-Lara, et al., "Smooth Loops from Unconstrained Video", In Computer Graphics Forum, vol. 34, Issue 4, 2015, 9 pages.
Yeh, et al., "A Tool for Automatic Cinemagraphs", Retrieved at <<http://www.csie.ntnu.edu.tw/~myeh/papers/mm12-demo.pdf>>, In Proceedings of the 20th ACM International Conference on Multimedia, Oct. 29, 2012, pp. 1-2.

(56) References Cited

OTHER PUBLICATIONS

Bollom, et al., "Creating User-Driven Cinemagraphs", Retrieved at <<http://www.matthewbollom.com/cinemagraphs/approach/>>, Retrieved Date: Feb. 9, 2013, pp. 1-12.

"Cliplets: Tutorials", Retrieved at <<http://research.microsoft.com/en-us/um/redmond/projects/cliplets/tutorials.aspx>>, Retrieved Date: Feb. 9, 2013, pp. 1-3.

"7 Apps to Create Cinemagraphs on Your Smartphone", Retrieved at <<http://www.hongkiat.com/blog/cinemagraph-iphone-android-apps/>>, Retrieved Date: Feb. 9, 2013, pp. 1-9.

INPUT VIDEO V

| 0 | 1 | 2 | 3 | 4 | 5 | 6 | 7 | 8 | 9 | 10 | 11 | 12 | 13 | 14 | 15 | 16 | 17 |

$p_1 = 5$ $p_2 = 8$

OUTPUT VIDEO LOOP L

| 0 | 1 | 2 | 3 | 4 | 5 | 6 | 7 | 8 | 9 | 10 | 11 | 12 | 13 | 14 | 15 | 16 | 17 |

VIDEO LOOP GENERATION

BACKGROUND

Visual imagery commonly can be classified as either a static image (e.g., photograph, painting) or dynamic imagery (e.g., video, animation). A static image captures a single instant in time. For instance, a static photograph often derives its power by what is implied beyond its spatial and temporal boundaries (e.g., outside the frame and in moments before and after the photograph was taken). Typically, a viewer's imagination can fill in what is left out of the static image (e.g., spatially and/or temporally). In contrast, video loses some of that power; yet, by being dynamic, video can provide an unfolding temporal narrative through time.

The spatial resolution of videos is generally approaching that of digital photographs. Video content is thus becoming more prevalent, and as storage and bandwidth continue to scale, videos may displace photographs as a default capture medium. Moreover, video loops may be computed from the videos, where the video loops can depict periodic motions (e.g., swaying trees, rippling water, a hair wisp blowing in the wind) in scenes captured in the videos. Various types of video loops can be created from an input video. For instance, a looping video (e.g., cinemagraph) can be created from an input video, where video regions are selectively frozen, played, and looped to achieve compelling effects. A looping video can combine static scenes with repeating movements; thus, some motion and narrative can be captured in such looping video. Accordingly, a dynamic element can be looping in a sequence of frames.

SUMMARY

Described herein are various technologies that pertain to generating an output video loop. An input video can be received, where the input video includes values at pixels over a time range. Respective input time intervals within the time range of the input video can be determined for the pixels in the input video. An input time interval for a particular pixel can include a per-pixel loop period of a single, contiguous loop at the particular pixel within the time range from the input video. Moreover, the output video loop can be created based on the values at the pixels over the respective input time intervals for the pixels in the input video.

Techniques set forth herein enable quality of the output video loop to be enhanced in comparison to conventional approaches, computation of the output video loop to be accelerated relative to the conventional approaches, and/or resources (e.g., processor cycles, memory) of a computing system used to create the output video loop to be reduced in comparison to the conventional approaches. According to various embodiments, the respective input time intervals for the pixels can be temporally scaled based on per-pixel loop periods and an output video loop period. The output video loop having the output video loop period can be created based on the values at the pixels over the respective input time intervals as scaled for the pixels in the input video.

In accordance with various embodiments, an optimization of an objective function can be performed to determine the respective input time intervals within the time range of the input video for the pixels in the input video. The optimization can be performed to assign the respective input time intervals to the pixels at a first level of resolution of the input video. Further, terms of the objective function can use a second level of resolution of the input video, where the first level of resolution is coarser than the second level of resolution.

Pursuant to various embodiments, the output video loop can be created at least in part by assembling the output video loop using multiple read streams on the input video. The multiple read streams on the input video can be used to read a portion of the input video into memory when creating a frame of the output video loop, while a remainder of the input video need not be memory-resident for creating such frame of the output video loop.

According to various embodiments, Poisson blending can be used to generate the output video loop. A spatial blend mask can be computed, where the spatial blend mask includes mask values indicative of ease of blending the pixels. Moreover, the respective input time intervals within the time range of the input video can be determined for the pixels by optimizing an objective function. The objective function can include a spatial consistency term and a temporal consistency term. The spatial consistency term and the temporal consistency term can be modulated by the spatial blend mask. Further, the output video loop can be created by assembling an initial video loop based on the values at the pixels over the respective input time intervals for the pixels in the input video and applying Poisson blending to generate the output video loop based on the initial video loop.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
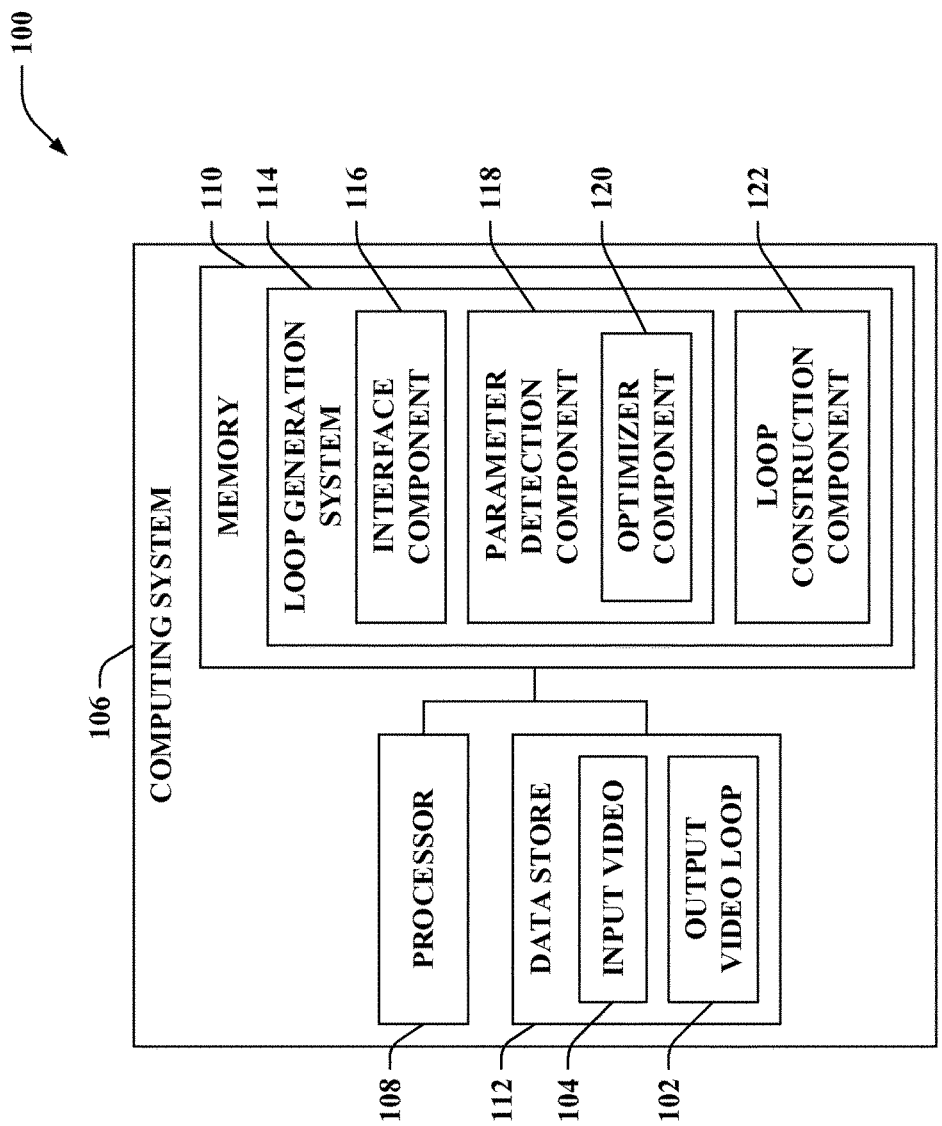
FIG. 1 illustrates a functional block diagram of an exemplary system that generates an output video loop from an input video.

Various technologies pertaining to generating an output video loop from an input video are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various techniques attempt to create video loops from input videos. Content can be assembled from an input video, such that three-dimensional (3D) spatiotemporal neighborhoods of the resulting video loop are consistent with those of the input video. The foregoing can be cast as a combinatorial optimization with an objective of color consistency.

As set forth herein, techniques are provided that enable quality of an output video loop to be enhanced in comparison to conventional approaches, computation of the output video loop to be accelerated relative to the conventional approaches, and/or resources (e.g., processor cycles, memory) of a computing system used to create the output video loop to be reduced in comparison to the conventional approaches. Moreover, the output video loop can be outputted in a standard container that can be played by components in a webpage, a media player, or the like (e.g., without requiring use of a specialized player).

Below are various exemplary techniques used in conjunction with generating the output video loop; these exemplary techniques are described in greater detail herein. It is to be appreciated that all of the following techniques need not be employed when creating the output video loop from the input video loop. According to an example, a two-dimensional (2D) optimization domain can be coarsened while maintaining accuracy of finer scale detail. By way of another example, spatiotemporal consistency terms can be modified using a spatial blend mask that anticipates an impact of subsequent Poisson blending. In accordance with another example, loopable pixels can be classified to reduce an optimization domain using a 2D binary mask. By way of a further example, dominant periods of loopable pixels can be identified to prune candidate loop periods and start frames. According to another example, undesired bias towards shorter loops can be mitigated. Pursuant to still another example, a screened Poisson formulation can be used to enable a fast multi-grid algorithm for gradient-domain blending. In accordance with another example, local temporal scaling can be applied to allow creation of an ordinary short loop, which can have the flexibility of differing per-pixel loop periods. By way of another example, the output video loop can be assembled as a streaming computation using multiple read streams to reduce memory usage.

Referring now to the drawings, FIG. 1 illustrates a system 100 that generates an output video loop 102 from an input video 104. The system 100 includes a computing system 106. The computing system 106 includes at least one processor 108 and memory 110. The processor 108 is configured to execute instructions loaded into the memory 110 (e.g., one or more systems loaded into the memory 110 are executable by the processor 108, one or more components loaded into the memory 110 are executable by the processor 108). As described in greater detail herein, the memory 110 includes a loop generation system 114 configured to generate the output video loop 102 from the input video 104, where the loop generation system 114 is executable by the processor 108; thus, the memory 110 includes instructions for generating the output video loop 102. The output video loop 102, for instance, can capture dynamism of a scene represented in the input video 104.

The computing system 106 can also include a data store 112. The data store 112 can retain the input video 104. The data store 112 can further retain the output video loop 102 created from the input video 104.

According to various examples, the computing system 106 can be or include a computing device. Pursuant to various illustrations, the computing device can be a desktop computing device, a mobile computing device (e.g., a laptop computing device, a mobile telephone, a smartphone, a tablet computing device, a wearable computing device, a handheld computing device, a portable gaming device, a personal digital assistant, a camera), a gaming console, an in-vehicle communications and infotainment system, or the like. In accordance with other examples, the computing system 106 can be or include one or more server computing devices. For instance, the computing system 106 can be or include one or more data centers, where a data center includes a plurality of server computing devices. Additionally or alternatively, the computing system 106 can be a distributed computing system.

The input video 104 includes values at pixels over a time range. The input video 104 can be represented as $V(x,t_i)$, where x denotes the 2D spatial domain of the input video 104 and $t_i$ denotes the 1D temporal domain of the input video. Accordingly, the input video 104 can have a color value $V(x,t_i)$ at each 2D pixel location x and input frame time $t_i$. The 2D pixel location x is also referred to herein as the pixel x.

The loop generation system 114 can create the output video loop 102, represented herein as $L(x,t)$, where x denotes the 2D spatial domain of the output video loop 102 and t denotes the 1D temporal domain of the output video loop 102. The output video loop 102 can be computed from the input video 102 as follows:

$$L(x,t)=V(x,\varphi(x,t)), 0\leq t\leq T \qquad (5)$$

In the foregoing, t represents an output frame time (of the output video loop 102), φ(x,t) is a time-mapping function, and T denotes an output video loop period of the output video loop 102. Accordingly, the loop generation system 114 can determine the time-mapping function φ(x,t) to create the output video loop 102. Moreover, the loop content L(x,•) at a given position x in the output video loop 102 is taken from the same pixel location V(x,•) in the input video 104.

The loop generation system 114 includes an interface component 116 that receives the input video 104. The interface component 116 can receive the input video 104 from the data store 112. Moreover, the interface component 116 can cause the output video loop 102 generated from the input video 104 to be retained in the data store 112.

The loop generation system 114 further includes a parameter detection component 118 configured to determine respective input time intervals within the time range of the input video 104 for the pixels in the input video 104. The input time intervals within the time range of the input video 104 for the pixels in the input video 104 are also referred to herein as loop parameters. An input time interval for a particular pixel can include a per-pixel loop period of a single, contiguous loop at the particular pixel within the time range from the input video 104. The input time interval for the particular pixel can further include a per-pixel start frame of the single, contiguous loop at the particular pixel within the time range from the input video 104.

The parameter detection component 118 can further include an optimizer component 120 configured to perform an optimization to determine the respective input time intervals within the time range of the input video 104 for the pixels in the input video 104. For example, the parameter detection component 118 can cause the optimizer component 120 to perform the optimization to determine the input time intervals within the time range of the input video 104 for the pixels that optimize an objective function.

A per-pixel loop period $p_x$ and per-pixel start frame $s_x$ at each pixel can be determined by the parameter detection component 118. The time-mapping function φ(x,t) can be based on the loop period $p_x$ and start frame $s_x$ as follows:

$$\varphi(x,t)=s_x+((t-s_x)\bmod p_x)$$

In regions of the input video 104 having nonloopable content, a pixel x may be assigned a loop period $p_x=1$. A loop period of 1 makes the pixel x static by freezing its color to that in a start frame $s_x$ for the pixel x. Accordingly, a per-pixel loop period for such pixel can be a unity per-pixel loop period, and the pixel can be static in the output video loop 102.

The parameter detection component 118 can determine a set of periods p={$p_x$} and start frames s={$s_x$} that minimize the following objective function:

$$E(p,s)=E_{consistency}(p,s)+E_{static}(p,s). \qquad (1)$$

In the foregoing objective function, the first term ($E_{consistency}$) encourages pixel neighborhoods in the output video loop 102 to be consistent both spatially and temporally with those in the input video 102. Moreover, the second term ($E_{static}$) assigns a penalty to static pixels to mitigate a trivial all-static solution. The term $E_{consistency}=E_{spatial}+E_{temporal}$ measures the spatiotemporal consistency of neighboring colors in the video loop with respect to the input video 104. The spatial consistency term sums consistency over spatially adjacent pixels x, z:

$$E_{spatial}=\sum_{\|x-z\|=1}\Psi_{spatial}(x,z)\gamma_s(x,z)$$

$$\Psi_{spatial}(x,z)=\frac{1}{T}\sum_{t=0}^{T-1}\left(\begin{array}{l}\|V(x,\phi(x,t))-V(x,\phi(z,t))\|^2+\\ \|V(z,\phi(x,t))-V(z,\phi(z,t))\|^2\end{array}\right)$$

The spatial consistency term measures compatibility for each pair of adjacent pixels x and z, averaged over the period T. Moreover, the temporal consistency term sums consistency across the loop-end frames $s_x$ and $s_x+p_x$ at each pixel:

$$E_{temporal}=\sum_x\left(\begin{array}{l}\|V(x,s_x)-V(x,s_x+p_x)\|^2+\\ \|V(x,s_x-1)-V(x,s_x+p_x-1)\|^2\end{array}\right)\gamma_t(x)$$

The temporal consistency term can compare, for each pixel, the value at the per-pixel start frame of the loop $s_x$ and the value after the per-pixel end frame of the loop $s_x+p_x$ (e.g., from a next frame after the per-pixel end frame) and, for symmetry, the value before the per-pixel start frame of the loop $s_x-1$ (e.g., from a previous frame before the per-pixel start frame) and the value at the per-pixel end frame of the loop $s_x+p_x-1$. Additionally, the factors $\gamma_s,\gamma_t$ can attenuate consistency in high-frequency regions.

The minimization of the objective function can be a 2D Markov Random Field (MRF) problem (e.g., evaluated by the optimizer component 120) in which each pixel can be assigned a label ($p_x,s_x$) from candidate loop periods and start frames. The 2D MRF problem can be solved by the optimizer component 120 using a multi-label graph cut algorithm, which can iterate through the set of labels several times. According to an example, for each label α, the optimizer component 120 can solve a 2D binary graph cut to determine if the pixel should keep its current label or be assigned label α. The foregoing can be referred to as alpha expansion.

Moreover, the loop generation system 114 includes a loop construction component 122 configured to create the output video loop 102 based on the values at the pixels over the respective input time intervals for the pixels in the input video 104. Accordingly, the parameter detection component 118 can determine the looping parameters from the input video 104, and the loop construction component 122 can utilize the looping parameters to create the output video loop 102. For example, the loop construction component 122 can use gradient-domain (e.g., Poisson) blending to diffuse inconsistencies in the output video loop 102. The blending applied by the loop construction component 122 can mitigate seams, pops, etc. in the resulting output video loop 102. A seam refers to a spatial inconsistency in the output video loop 102, and a pop refers to a temporal inconsistency in the output video loop 102.

Figure 2:
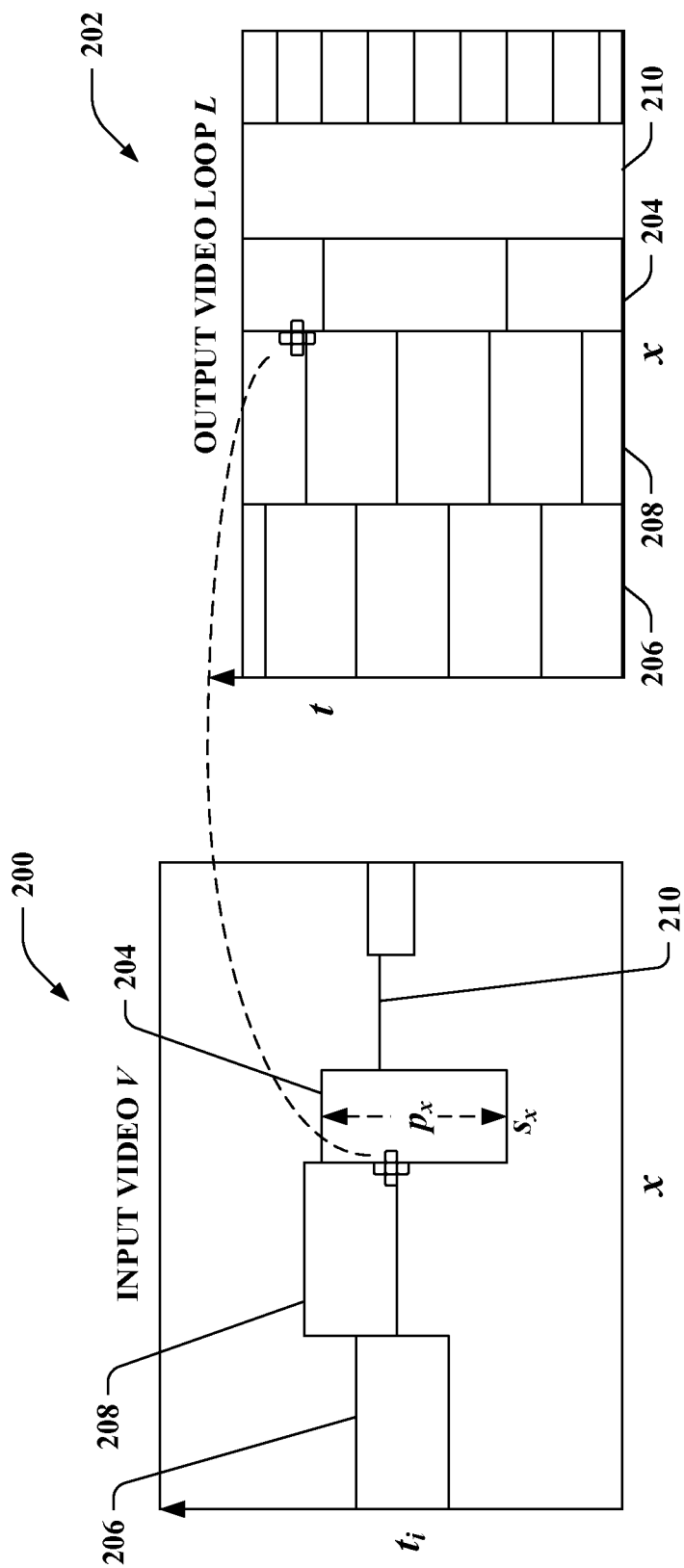
FIG. 2 illustrates an exemplary input video, $V(x,t_i)$, and a corresponding exemplary output video loop, $L(x,t)$, where x denotes the two-dimensional (2D) spatial domain of the input video and the output video loop, $t_i$ denotes the one-dimensional (1D) temporal domain of the input video, and t denotes the 1D temporal domain of the output video loop.

Turning to FIG. 2, illustrated is an exemplary input video 200, V(x,$t_i$), and a corresponding exemplary output video loop 202, L(x,t). Input time intervals can be determined for each pixel in the input video 200 (e.g., by the parameter detection component 118 of FIG. 1). As shown, pixels included in a spatial region 204 of the input video 200 each have a per-pixel start frame of $s_x$ and a per-pixel loop period of $p_x$. Further, as depicted, pixels included in a spatial region 206 of the input video 200 and pixels included in a spatial region 208 of the input video 200 each have a common per-pixel loop period. However, a per-pixel start frame of the pixels included in the spatial region 206 of the input video 200 differs from a per-pixel start frame of the pixels included in the spatial region 208 of the input video 200. Moreover, pixels included in a spatial region 210 of the input video 200 are static (e.g., a unity per-pixel loop period).

Values from the respective input time intervals for the pixels from the input video 200 can be time-mapped to the output video loop 202. For example, the input time interval from the input video 200 for the pixels included in the spatial region 206 can be looped in the output video loop 202 for the pixels included in the spatial region 206. Also, as depicted, static values for the pixels included in the spatial region 210 from a specified time of the input video 200 can be maintained for the pixels included in the spatial region 210 over a time range of the output video loop 202.

The output video loop 202 is formed from the input video 200 by repeating a contiguous temporal interval at each pixel x using the time-mapping function φ, specified using a loop period $p_x$ and a start frame $s_x$. Moreover, a consistency objective used when creating the output video loop 202 can be that spatiotemporal neighbors of a pixel at a time frame in the output video loop 202 should have the same values as corresponding neighbors of the pixel in the input video 200.

Reference is again made to FIG. 1. The loop generation system 114 can enable quality of the output video loop 102 to be enhanced in comparison to conventional approaches (e.g., seams and pops can be mitigated in the output video loop 102), computation of the output video loop 102 to be sped up relative to the conventional approaches (e.g., computation time can be reduced from tens of minutes to nearly realtime), and/or resources (e.g., processor cycles, memory) of the computing system 106 used to create the output video loop to be reduced in comparison to the conventional approaches. Moreover, the output video loop 102 created by the loop generation system 114 need not be played using a specialized video playback component; rather, the output video loop 102 can be outputted by the loop generation system 114 in a standard container that can be played by components in a webpage, a media player, or the like.

Various techniques implemented by the loop generation system 114 for generating the output video loop 102 are described herein. It is to be appreciated that one or more of these techniques need not be used when generating the output video loop 102. Additionally or alternatively, it is contemplated that one or more of the techniques set forth herein can be used in combination with techniques other than those described herein.

Below are various exemplary techniques that can be implemented by the loop generation system 114; these techniques are described herein in greater detail. According to an example, the loop generation system 114 can use an objective function having a consistency term adapted to account for subsequent Poisson blending (e.g., the loop construction component 122 can apply the Poisson blending); adapting the consistency term can enable looping of low-frequency content like moving clouds and changing illumination. By way of another example, the loop generation system 114 can mitigate a bias towards short loops commonly seen with traditional approaches. The loop generation system 114, according to another example, can restrict optimization to be performed for potential loopable pixels using a masked 2D graph cut algorithm. In accordance with another example, graph cut labels can be pruned based on dominant periods. According to a further example, the optimization solved by the optimizer component 120 can operate on a coarse grid while retaining objective terms based on finer-level detail.

For various scenes, color consistency constraints may not be fully satisfied, resulting in spatial seams or temporal pops. Some traditional approaches aim to reduce or hide these artifacts. Examples of such traditional approaches include applying feathering or multi-resolution splining as a post-process; using gradient-domain Poisson blending to enhance results by diffusing spatiotemporal discrepancies; adaptively attenuating consistency constraints for high-frequency regions; and making some spatial regions static (e.g., assigning period $p_x=1$) either using assisted segmentation or as part of an optimization (e.g., which may result in little dynamism remaining).

In contrast to foregoing techniques, the parameter detection component 118 of the loop generation system 114 can modulate a consistency term of an objective function as part of a loop synthesis algorithm to anticipate subsequent Poisson blending, and thereby provide greater flexibility for optimization. For instance, low-frequency image differences (e.g., smooth intensity changes due to illumination changes or moving clouds/smoke) can be ignored, since such differences can be corrected through Poisson blending. Moreover, distinct shape boundaries may be unable to be repaired via blending, and thus, the modulation of the consistency term can account for the inability to perform such blending.

Figure 3:
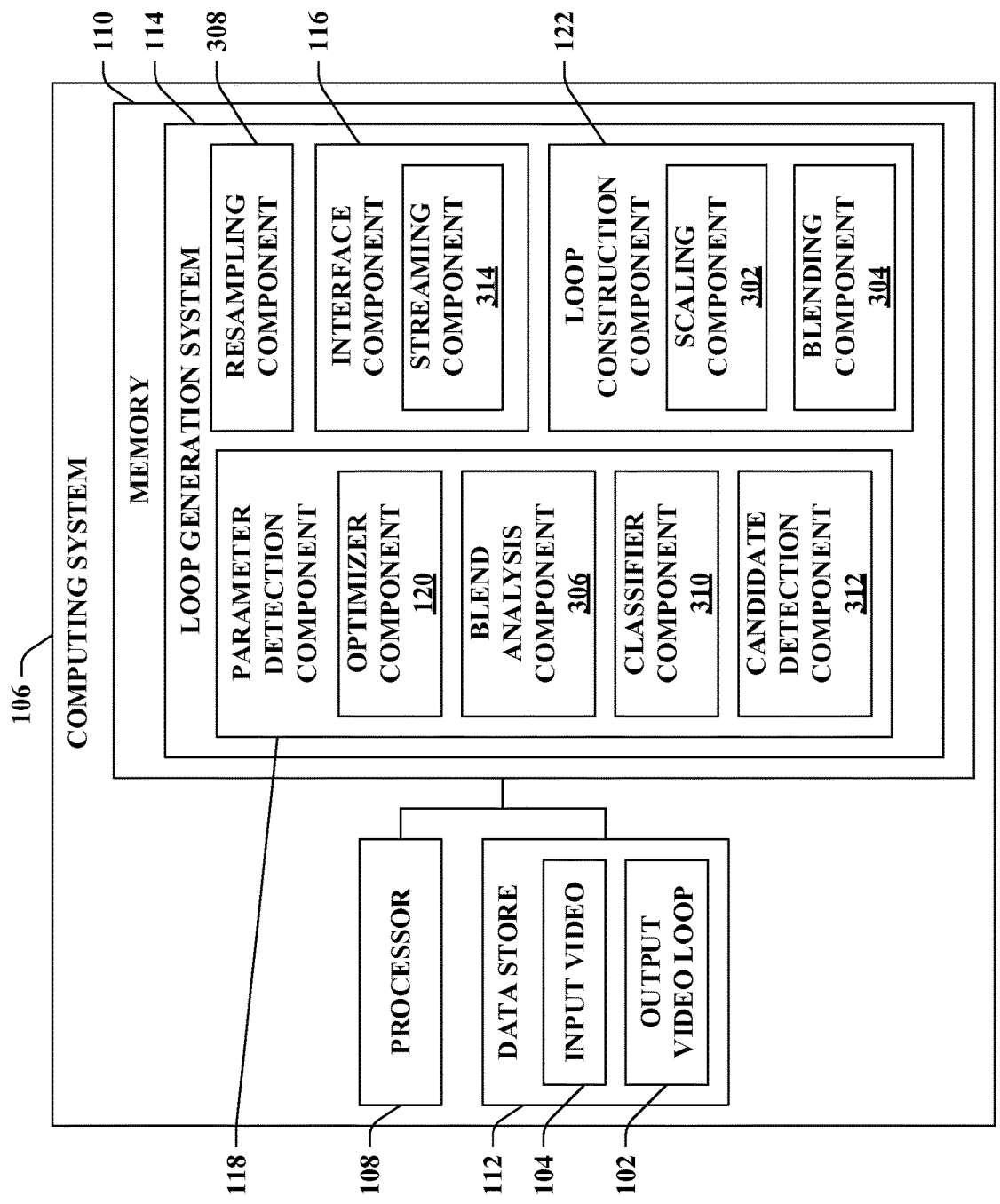
FIG. 3 illustrates a functional block diagram of the computing system of FIG. 1 in greater detail.

Now turning to FIG. 3, illustrated is the computing system 106 in greater detail. The computing system 106 again includes the processor 108, the memory 110, and the data store 112. The memory 110 further includes the loop generation system 114, which includes the interface component 116, the parameter detection component 118, and the loop construction component 122.

The loop construction component 122 can further include a scaling component 302 configured to temporally scale the respective input time intervals for the pixels based on the per-pixel loop periods and an output video loop period of the output video loop 102. Accordingly, the input time intervals for the pixels determined by the parameter detection component 118 can be temporally scaled by the scaling component 302. Further, the loop construction component 122 can create the output video loop 102 having the output video loop period based on the values at the pixels over the respective input time intervals as scaled for the pixels in the input video 104.

The optimization over p,s allows pixels to have different looping periods. Playback of an output video loop having pixels with differing looping periods, however, may not be supported in common video playback components. While it is possible to create a repeating loop whose length is a least common multiple of the periods in p, such a loop may often be impractically long. Accordingly, the scaling component 302 can temporally scale the content such that each per-pixel loop period adjusts to a nearest integer number of instances in a fixed size loop (e.g., the output video loop period). The scaling component 302 applies local temporal scaling to allow creation of an ordinary short loop even with the flexibility of differing per-pixel loop periods.

Figure 4:
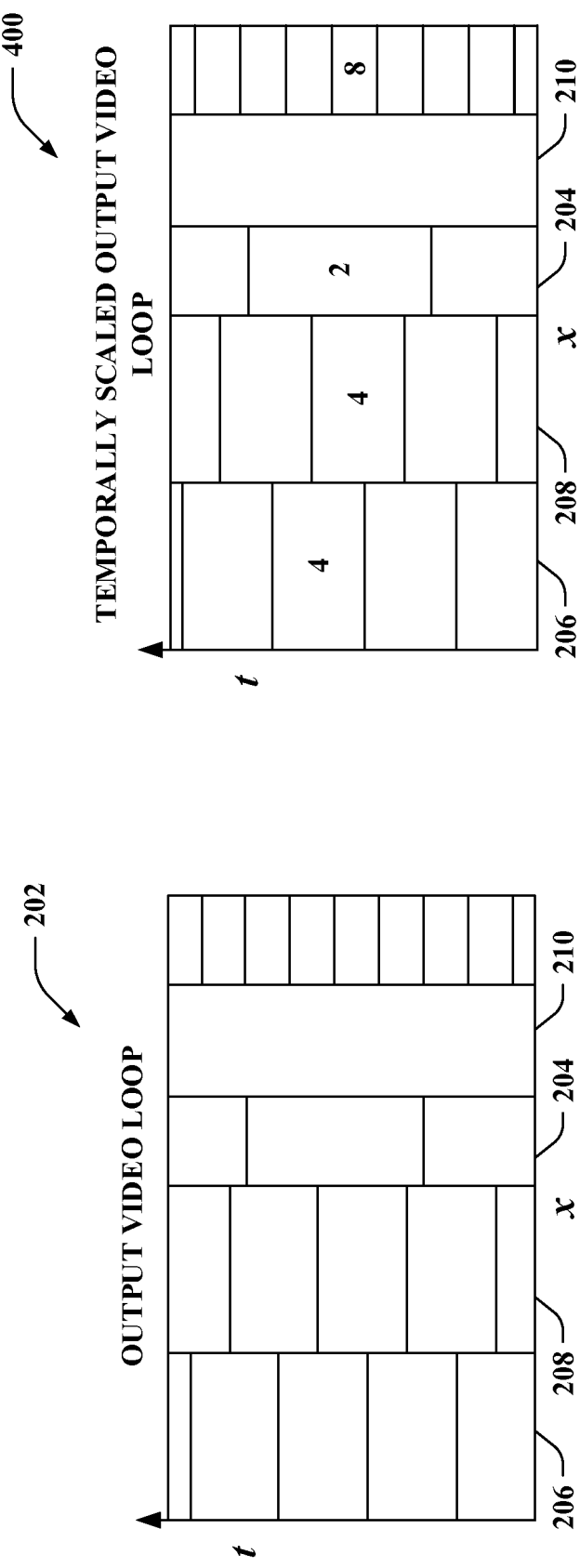
FIG. 4 illustrates the exemplary output video loop from FIG. 2 as well as an exemplary temporally scaled output video loop.

With reference to FIG. 4, illustrated is the output video loop 202 from FIG. 2 as well as a temporally scaled output video loop 400. Local temporal scaling can be employed to create the temporally scaled output video loop 400 by temporally stretching or shrinking each per-pixel loop period to an integer number of loop instances. For example, when generating a 150-frame loop (e.g., the output video loop period being 150 frames), given a pixel whose looping content is 40 frames (e.g., a pixel in the spatial region 206), the content can be temporally scaled by the scaling component 302 of FIG. 3 by a factor of 0.9375 to obtain four loop instances in the temporally scaled output video loop 400. A perturbed time-mapping function φ'(x,t) can be obtained, in which incrementing the output time t can sometimes repeat or skip an input video frame. While many of the examples set forth herein describe using local temporal scaling to generate a 5 second period for the output video loop period (e.g., T=150 frames), it is to be appreciated that the claimed subject matter is not so limited.

The temporal scaling may not introduce appreciable artifacts because pixels with the same per-pixel loop period are adjusted by the same factor so that their spatiotemporal relationships are preserved. However, boundaries between pixels with different per-pixel loop periods can have spatial seams worsened. Yet, the spatial consistency cost $\Psi_{spatial}(x,z)$ between two neighboring pixels with different loop periods can assume that these periods are independent (e.g., relatively prime), so generally these boundaries may lie along pixels with relatively unchanging content, and thus, temporal scaling can have minimal visible effect.

Reference is again made to FIG. 3. According to an example, Poisson blending can be applied by the loop construction component 122 to generate the output video loop 102. Following this example, given the loop parameters p,s determined by the parameter detection component 118 (e.g., computed in the multi-label graph cut), local temporal scaling performed by the scaling component 302 can be used for both defining an initial video loop L and formulating the Poisson blending which determines a final output video loop L' (e.g., the output video loop 102).

The loop construction component 122 can further include a blending component 304 configured to apply Poisson blending as part of creating the output video loop 102. Moreover, the parameter detection component 118 can include a blend analysis component 306, which enables the parameter detection component 118 to determine the respective input time intervals based on the subsequent application of Poisson blending by the blending component 304.

The blend analysis component 306 can be configured to compute a spatial blend mask. The spatial blend mask includes mask values indicative of ease of blending the pixels of the input video 104. The spatial blend mask can be used to modulate the spatial consistency term and the temporal consistency term of the objective function optimized by the parameter detection component 118. Accordingly, the parameter detection component 118 can determine the respective input time intervals within the time range of the input video 104 for the pixels that optimize the objective function, where the objective function includes the spatial consistency term and the temporal consistency term modulated by the spatial blend mask. When creating the output video loop 102, the loop construction component 122 can assemble an initial video loop based on the values at the pixels over the respective input time intervals (e.g., as scaled by the scaling component 302) for the pixels in the input video 104. Moreover, the blending component 304 can apply Poisson blending to generate the output video loop 102 based on the initial video loop.

The blending component 304 can apply Poisson blending to video looping so that discrepancies at stitching boundaries (both spatial and temporal) can be diffused over a full domain. The blending component 304 can use a weak prior based on colors in an initial (e.g. unblended) video loop L and can optimize the blended colors in the output video loop 102 L' over a full 3D domain. Accordingly, the following can be sought:

$$\min_{L'}(E'_{consistency}(L') + \alpha\|L' - L\|^2)$$

In the foregoing, $E'_{consistency}=E'_{spatial}+E'_{temporal}$ measures gradient-domain spatiotemporal consistency by comparing differences of adjacent colors in the output video loop 102 and the original input video 104. The term $E'_{spatial}$ is based on the following:

$$\Psi'_{spatial}(x,z) = \frac{1}{T}\sum_{t=0}^{T-1}\left(\left\|\begin{array}{c}(L'(z,t)-L'(x,t))-\\(V(z,\phi'(x,t))-V(x,\phi'(x,t)))\end{array}\right\|^2 + \left\|\begin{array}{c}(L'(z,t)-L'(x,t))-\\(V(z,\phi'(z,t))-V(x,\phi'(z,t)))\end{array}\right\|^2\right)$$

Moreover, $E'_{temporal}$ is based on the following:

$$\frac{p_x}{T}\sum_{t=0}^{T-1}\left(\left\|\begin{array}{c}(L'(z,t)-L'(x,t))-\\(V(z,\phi'(x,t))-V(x,\phi'(x,t)))\end{array}\right\|^2 + \left\|\begin{array}{c}(L'(z,t)-L'(x,t))-\\(V(z,\phi'(z,t))-V(x,\phi'(z,t)))\end{array}\right\|^2\right)$$

The foregoing uses wraparound temporal access to L'. Note that $E'_{consistency}$ reduces to $E_{consistency}$ when L'=L (e.g., assuming that both are defined using the temporally scaled φ'). The minimization can be equivalent to $$\min_{L'}\|\nabla L' - g\|^2 + \alpha\|L' - L\|^2,$$

where g is a gradient field defined from V and φ'. Its solution can correspond to a screened Poisson equation, (Δ−α) L'=∇·g−αL.

Dirichlet constraints need not be used at boundaries as part of the screened Poisson blending implemented by the blending component 304, which enables solving a linear system using a multi-grid algorithm. Such algorithm can coarsen the domain in both the spatial and temporal dimensions with a 3D box filter. Solutions can be obtained using multi-grid V-cycles and iterations of Gauss-Seidel relaxation per level on each leg of a V-cycle. It is contemplated that substantially any number of multi-grid V-cycles can be used (e.g., ten multi-grid V-cycles, three multi-grid V-cycles).

Conventional approaches that solved for $$\min_{p,s}E(p,s)$$

commonly ran to account for the fact that Poisson blending may yet diffuse inconsistencies to obtain a seamless solution (e.g., with lower $E'_{consistency}$). As an example, consider a scene whose illumination brightens slowly over time; temporal consistency compares the colors near the loop start and end frames. Because the colors differ, the optimization is likely to favor short loops or may freeze the scene altogether, whereas Poisson blending may smooth away the low-frequency illumination change, even for a long loop. Although for this case it may be possible to globally adjust illumination as a pre-process, a benefit of Poisson blending is that it may apply more generally. For instance, Poisson blending may also be effective spatially and on local discrepancies.

It may be desirable to minimize the gradient-domain-based objective function E'(p,s,L') over both the combinatorial loop parameters p,s and the final blended colors L'. Such objective function can be represented as follows:

$$E'(p,s,L')=E'_{consistency}(p,s,L')+E_{static}(p,s) \quad (2)$$

However, minimization of this objective function may be challenging because changes in p,s result in structural changes to the desired gradient field g.

Instead, the parameter detection component 118 (e.g., the optimizer component 120) can be configured to minimize Equation (1) set forth above using a modified objective function $E^*=E^*_{consistency}+E_{static}$, where the consistency term is blend-aware. The blend-aware consistency term can enable more pixels in the input video 104 to loop in the output video loop 102 and/or enable pixels to have longer per-pixel loop periods in the output video loop 102 (relative to using the objective function set forth in Equation (1)).

The blend-aware consistency term can lead to seams in an initial video loop L, but these seams can be smoothed during the subsequent Poisson blending performed by the blending component 304, resulting in an enhanced output video loop 102 L'. Moreover, temporal discontinuities can similarly be addressed due to the subsequent Poisson blending performed by the blending component 304.

From the input video 104, the blend analysis component 306 can compute a spatial blend mask B that is used to modulate the spatial and temporal consistency terms. B(x) can be small if pixel x is not traversed by a sharp boundary in the input video 104 (e.g., if it is in a blendable region).

The blend analysis component 306 can compute the spatial blend mask B at each pixel based on a maximum temporal derivative of a high-pass signal of the input video 104. As set forth in the following derivation, this can be approximated by a maximum temporal derivative.

Let $V_L=V*G$ be a spatially blurred version of the input video 104 obtained with a spatial Gaussian filter G. The high-pass signal therefore can be $V_H=V-V_L$. Its temporal derivative can be:

$$V_H^{t+1} - V_H^t = (V^{t+1} - V^{t+1} * G) - (V^t - V^t * G)$$
$$= (V^{t+1} - V^t) - (V^{t+1} - V^t) * G$$
$$\approx (V^{t+1} - V^t)$$

The foregoing approximation can exploit the fact that the temporal derivatives have lower magnitude and become negligible after the spatial blur. Thus, for each pixel position x, the blend analysis component 306 can assign the following spatial blend mask:

$$B(x) = \text{clamp}\left(\max_t (V(x, t+1) - V(x, t)) \cdot c_b, 0, 1\right)$$

In the foregoing, $c_b$ denotes a scaling factor. For example, the scaling factor $c_b=1.5$ can be used. The resulting spatial blend mask B can have a value of 1 for regions that include sharp transitions and therefore are not easily blended. Moreover, regions that have low values of B can reflect the fact that they are easily blended. The parameter detection component 118 can use B(x) to modulate the spatial and temporal consistency terms as set forth below:

$$E^*_{spatial} = \sum_{\|x-z\|=1} \Psi_{spatial}(x, z)\gamma_s(x, z) \max(B(x), B(z))$$

and $$E^*_{temporal} = \sum_x \left( \begin{array}{l} \|V(x, s_x) - V(x, s_x + p_x)\|^2 + \\ \|V(x, s_x - 1) - V(x, s_x + p_x - 1)\|^2 \end{array} \right) \gamma_t(x)B(x)$$

In the foregoing, the spatial blend mask factors can supplement the local edge strength modulation factors $\gamma_s(x)$, $\gamma_t(x)$. The edge strength factors $\gamma$ are based on average or median differences of pixel colors. The edge strength factors can reflect the fact that seams are less perceptible in high-frequency (e.g., textured) regions, and pops are less perceptible on highly dynamic pixels. In contrast, the spatial blend mask B is based on maximum differences, and can reflect the fact that seams and pops are less perceptible away from moving sharp boundaries after gradient-domain blending by the blending component 304. A net effect can be to focus consistency constraints on regions where color discrepancies are less likely to be corrected by subsequent blending by the blending component 304. According to an example, the blend analysis component 306 can compute the spatial blend mask B by considering the full input video 104, even though the generated output video loop 102 accesses only a temporal subset of the input video 104.

Moreover, pursuant to various examples, the parameter detection component 118 can employ an adapted temporal consistency term to promote longer loops in the output video loop 102. Conventional approaches may use temporal consistency terms that tend to favor shorter video loops. Some traditional approaches set a minimum duration for a loop period; however, such approaches may result in often using the minimum duration. A bias towards shorter loops may be due to the difference between a given frame and progressively later frames tending to increase as small differences (e.g., lighting variations, shifting objects) gradually accumulate in the scene.

To analyze the foregoing, the difference $d^{0.8}(V(\bullet,t_1), V(\bullet,t_2))$ of two video frames $t_1, t_2$ can be defined as the $80^{th}$-percentile absolute error of the corresponding pixels. The percentile error can be more robust than a traditional $L^2$ metric, as it ignores large errors in nonloopable regions, which are likely made static in an output video loop. According to an example, the foregoing evaluation can be sped up by sampling it on a 25% subset of image pixels.

For a synchronous loop in which pixels share a loop period p and a start frame s, a cost d(p,s) can be measured at the two nearest transition frames as:

$$d(p,s)=(d^{0.8}(\tilde{V}(\bullet,s),\tilde{V}(\bullet,s+p))+d^{0.8}(\tilde{V}(\bullet,s-1),\tilde{V}(\bullet,s+p-1)))$$

Figure 5:
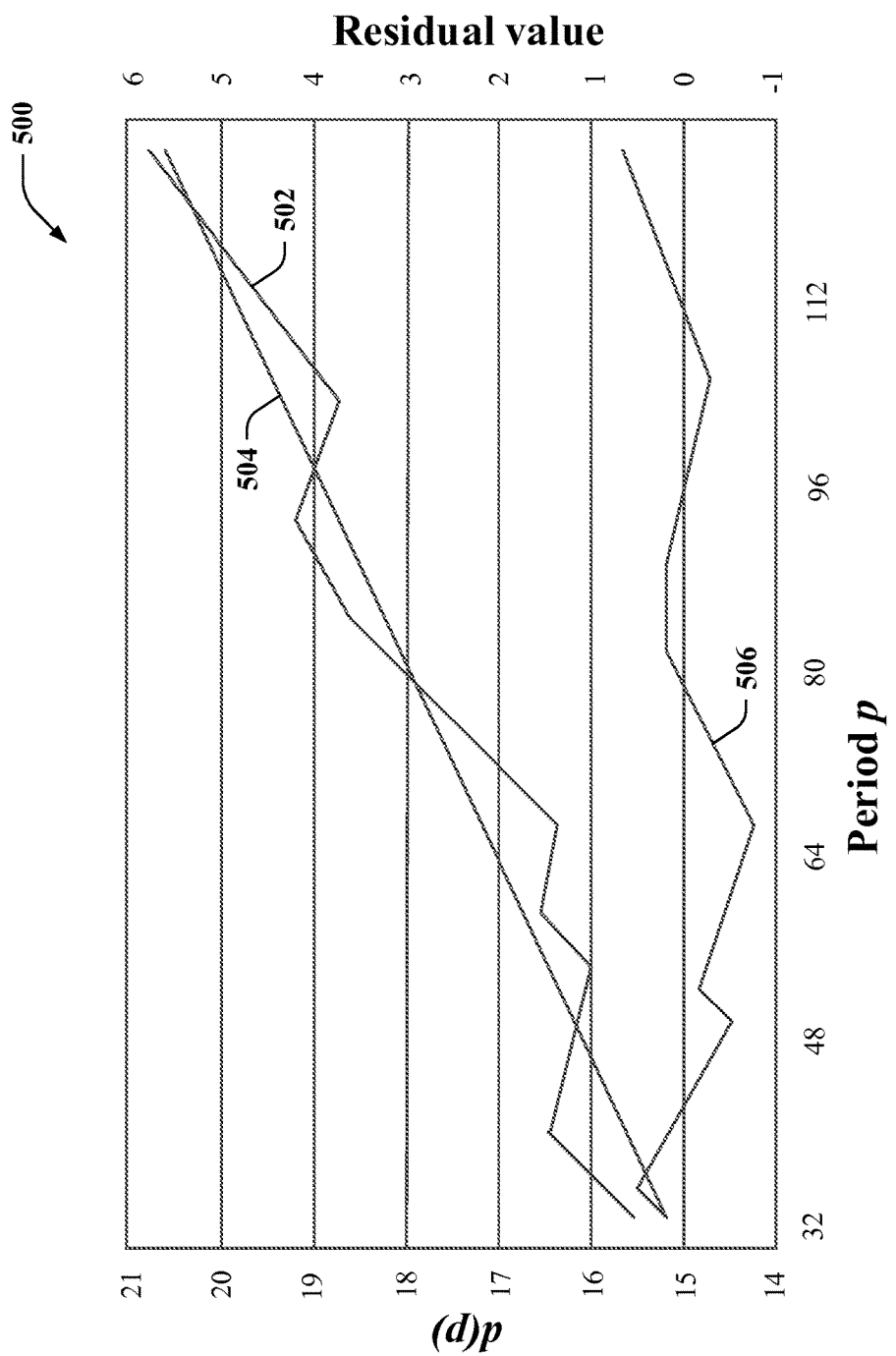
FIG. 5 illustrates an exemplary graph showing a temporal cost curve of synchronous loops as a function of loop period p, a linear fit curve of the temporal cost curve, and a residual curve.

Turning to FIG. 5, illustrated is an exemplary graph 500 showing a temporal cost curve 502 d(p) of synchronous loops as a function of loop period p. Also depicted are a linear fit curve 504 of the temporal cost curve 502 and a residual curve 506 $d_R(p)$. The temporal cost can be evaluated as $$d(p) = \min_s d(p, s);$$

thus, the temporal cost can be a minimum cost of the synchronous loop for each loop period. As depicted, even for a scene with some natural cyclic motion (e.g., a period of about 68 frames in example shown in the graph 500), although the temporal cost curve 502 d(p) dips slightly at a period of 68 frames, the upward trend leads to the temporal cost curve 502 d(p) not having a minimum at a period of 68 frames. Yet, it may be preferable to use a longer loop period if possible (e.g., if scene elements are loopable), because the longer loop period can increase the variety of unique content in the resulting output video loop 102 and can reduce frequency of temporal blending artifacts.

Again, reference is made to FIG. 3. To address the foregoing, for the input video 104, the parameter detection component 118 can compute d(p) and fit an affine model $\tilde{d}(p)=mp+b$ (as shown by the linear fit curve 504 in FIG. 5). Moreover, the temporal consistency term can be redefined at any pixel x to subtract this affine model (to provide the adapted temporal consistency term):

$$E^{*(adapted)}_{temporal}(x) = E^{*(old)}_{temporal}(x) - \tilde{d}(p_x)$$

Moreover, local minima in the residual costs $d_R(p,s)=d(p,s)-\tilde{d}(p)$ can be used to select candidate periods for loop optimization as described in greater detail below.

The loop generation system 114 can further include a resampling component 308. The resampling component 308 can be configured to perform spatiotemporal downsampling of the input video 104. According to an example, the input video 104 and the output video loop 102 can both be 5 seconds long and sampled at 30 frames/second. The resampling component 308 can compute a spatiotemporally downsampled version $\tilde{V}$ of the input video 104 using a 3D box filter. The temporal scaling factor can be 4, for example. The spatial scaling factor can be a power of two. For instance, the resulting vertical size can be no larger than 350; however, the claimed subject matter is not so limited. For example, an input video with a resolution 3840×2160×150 can be scaled to 480×270×37; yet, the claimed subject matter is not so limited. Various computations can be performed on $\tilde{V}$, except the graph cut which can define its objective function using a next finer level of detail, and Poisson blending which can output at full resolution.

The parameter detection component 118 can further include a classifier component 310 configured to classify the pixels in the input video 104 as unchanging, unloopable, or loopable. Moreover, the classifier component 310 can be configured to set a subset of the pixels classified as unchanging or unloopable to be static in the output video loop 102. The parameter detection component 118 can perform the optimization to determine the respective input time intervals within the time range of the input video 104 for a remainder of the pixels classified as loopable.

For instance, given the downsampled video $\tilde{V}$ outputted by the resampling component 308, the classifier component 310 can identify spatial regions that are unlikely to form good loops, so as to reduce the optimization effort to a smaller subset of pixels. The classifier component 310 can classify each pixel into one of three classes: unchanging (e.g., constant in $\tilde{V}$), unloopable (e.g., dynamic but unable to loop), or loopable. Pixels classified as unchanging or unloopable are made static and not considered in the optimization performed by the parameter detection component 118. Unchanging and unloopable pixels are collectively referred to herein as nonloopable pixels. According to an example, classification can be conservative, erring on the side of labeling pixels as loopable (e.g., the optimization can cause a pixel to be static in the output video loop 102).

The classifier component 310 can compute initial binary scores (0,1) for each of the three classes at each pixel independently, spatially smooth the scores, and classify each pixel based on its maximum score. More particularly, the classifier component 310 can initially compute binary scores (0,1) for each of the three classes at each pixel as follows. Given pixel x and color channels $c \in \{0,1,2\}$, the following can defined $$\left(e.g., \text{ using } \epsilon = \frac{10}{255}\right):$$

$$\text{rises}(x,c) = \exists t_1, t_2 \text{ s.t. } t_1 < t_2 \wedge \tilde{V}_c(x,t_2) - \tilde{V}_c(x,t_1) > \epsilon$$

$$\text{falls}(x,c) = \exists t_1, t_2 \text{ s.t. } t_1 < t_2 \wedge \tilde{V}_c(x,t_1) - \tilde{V}_c(x,t_2) > \epsilon$$

These predicates can be computed by the classifier component 310 in a single traversal of the input video 104 by tracking running minimum and maximum values at each pixel. Further, the classifier component 310 can assign a label for each pixel x as follows (where $\vee$ denotes xor):

$$\text{label}(x) \leftarrow \begin{cases} \text{unchanging} & \text{if } \forall c \neg \text{rises}(x,c) \wedge \neg \text{falls}(x,c) \\ \text{unloopable} & \text{if } \exists c \text{ rises}(x,c) \veebar \text{falls}(x,c) \\ \text{loopable} & \text{otherwise} \end{cases}$$

The classifier component 310 can further apply a Gaussian blur (e.g., σ=7 pixels) to each of the three score fields. The Gaussian blur can remove small islands of static pixels in larger looping regions as well as small islands of dynamic pixels in static regions, both of which can be visually distracting. The classifier component 310 can further classify each pixel according to its maximum smoothed score.

Figure 6:
FIG. 6 illustrates a representative frame of an exemplary input video and a loopable mask corresponding to the representative frame.
Figure 6:
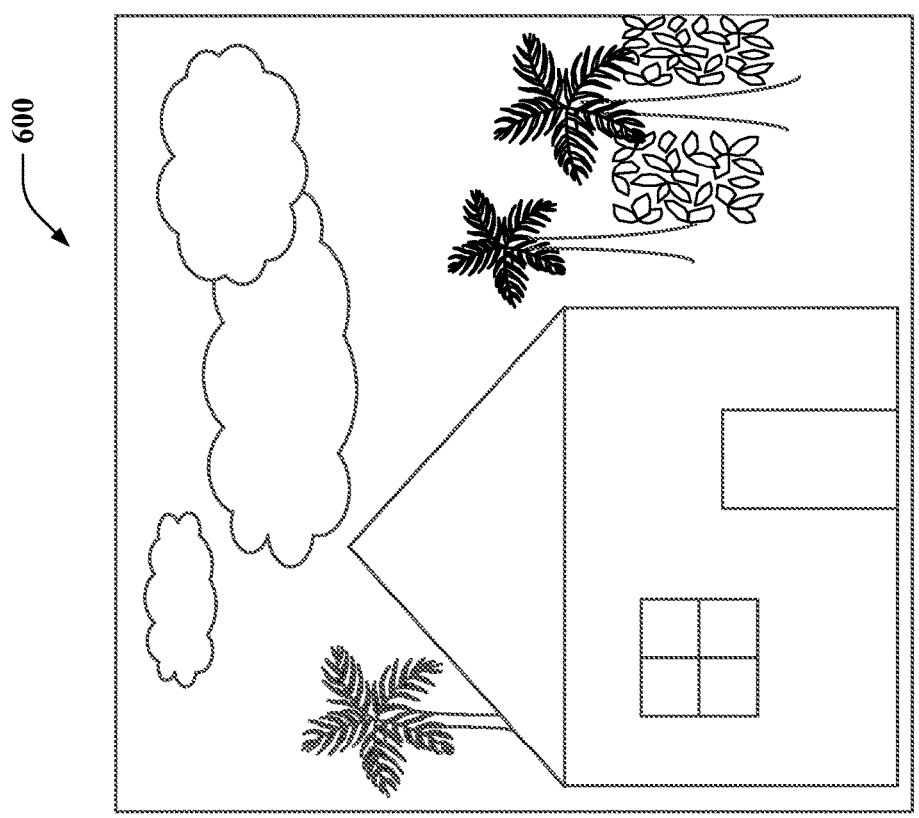

FIG. 6 depicts a representative frame 600 of an exemplary input video and a loopable mask 602 corresponding to the representative frame 600. Unchanging and unloopable pixels can be made static, whereas loopable pixels define a mask (shown in black in the loopable mask 602) of the subset of the pixels to be optimized during the graph cut (e.g. performed by the optimizer component 120). The loopable mask 602 can be a binary mask of loopable pixels.

Reference is again made to FIG. 3. When nonloopable pixels are excluded from the graph cut formulation performed by the optimizer component 120, the graph is no longer a regular 2D grid. Although a version of graph cut designed for general graphs can be invoked, it can be more efficient to preserve the regular connectivity of the 2D graph and instead modify the graph cut solution to account for the binary mask. More particularly, computation of data cost terms for nonloopable pixels can be omitted, since such pixels cannot change. Moreover, for a nonloopable pixel x adjacent to a loopable pixel z, the smoothness cost $E^*_{spatial}(x,z)$ can be transferred to the data cost of the loopable pixel z.

According to an example, the computation of the spatial blend mask B performed by the blend analysis component 306 need not be performed for nonloopable pixels. Pursuant to another example, nonloopable pixels can be excluded from estimates of dominant looping periods as described in greater detail below. It is contemplated, however, that the claimed subject matter is not limited to the foregoing examples.

The parameter detection component 118 can further include a candidate detection component 312 configured to select candidate pairs of loop periods and start frames from the input video 104. The candidate detection component 312 can select less than all possible pairs of the loop periods and the start frames from the input video 104 as the candidate pairs. Accordingly, the parameter detection component 118 can determine the respective input time intervals within the time range of the input video 104 for the pixels in the input video 104 from the candidate pairs of the loop periods and the start frames. The candidate detection component 312 can select the candidate pairs of the loop periods and the start frames from the input video 104 based on temporal costs for the loop periods. The temporal costs can be based on differences between frame pairs separated by the loop periods in the input video 104 (e.g., the candidate pairs can be selected based on local minima in the residual costs $d_R(p,s)$). Moreover, the candidate pairs of the loop periods and the start frames can include a static frame having a unity loop period. The static frame can be selected based on two or more of the candidate pairs other than the static frame.

Conventional approaches can consider all periods {p} and all possible start frames {s} for each period. For a 4× temporal downsampled 5-second input video (e.g., 37 frames), and a minimum loop period of eight frames, this can result in a multi-labeled graph cut with 502 labels, (s=0, 1, . . . 37|p=1; s=0, 1, . . . 29|p=8; s=0, 1, . . . 28|p=9; . . . ; s=0|p=37). Performing alpha expansion over these labels can be costly. Accordingly, the candidate detection component 312 can heuristically prune the foregoing labels to the candidate pairs of the loop periods and the start frames. For instance, it is to be appreciated that the candidate detection component 312 can prune the set of labels to 21 candidate pairs as follows.

The candidate detection component 312 can identify two dominant periods in the input video 104, a long period to provide greater content variety and a shorter period to provide a fallback for regions on which there are no good long loops. The candidate detection component 312 can use the adjusted synchronous temporal costs $d_R(p,s)$ from above to identify a first dominant period $$(p_1, s_1) = \underset{(p,s)}{\mathrm{argmin}} d_R(p, x)$$

(e.g., a first synchronous loop of pixels). The cost can be computed over the loopable pixels identified by the classifier component 310. Moreover, loop periods greater than a threshold duration can be disallowed (e.g., greater than 4 seconds, p>30) because loop lengths that approach the length of the input video 104 can have insufficient variety of start frames to allow sufficient loop creation. The candidate detection component 312 can further identify a second dominant period $(p_2, s_2)$, where the periods $p_1$ and $p_2$ differ by at least predetermined percentage (e.g., 25%) of a maximum loop period and the two loops overlap (e.g., $[s_1, s_1+p_1) \cap [s_2, s_2+p_2) \neq \emptyset$).

For each of the two dominant periods $(p_i, s_i)$, the candidate detection component 312 can also select nine nearest start frames as additional candidates, which provides for 20 labels in total. The 21st label can be for a static frame (e.g., period p=1), which can be selected as a middle frame of the overlap of the two dominant periods $(p_i, s_i)$. Pixels can be initialized with labels that correspond to the longer of the two dominant periods $(p_i, s_i)$ found above.

As noted herein, the optimizer component 120 can perform the optimization of the objective function to determine the respective input time intervals within the time range of the input video 104 for the pixels in the input video 104. According to an example, the optimization can be performed by the optimizer component 120 to assign the respective input time intervals to the pixels at a first level of resolution of the input video 104. Moreover, terms of the objective function can use a second level of resolution of the input video, where the first level resolution is coarser than the second level of resolution. As the graph cut can be a computational bottleneck, it can be desirable to perform the computation for the optimization at a coarse spatial resolution (e.g., 480×270 of $\tilde{V}$). However, at this resolution, the loss of fine scale detail can degrade the estimates of spatial consistency and temporal consistency. Accordingly, the optimizer component 120 can evaluate the consistency objectives at a finer resolution (e.g., double the spatial resolution of $\tilde{V}$).

Figure 7:
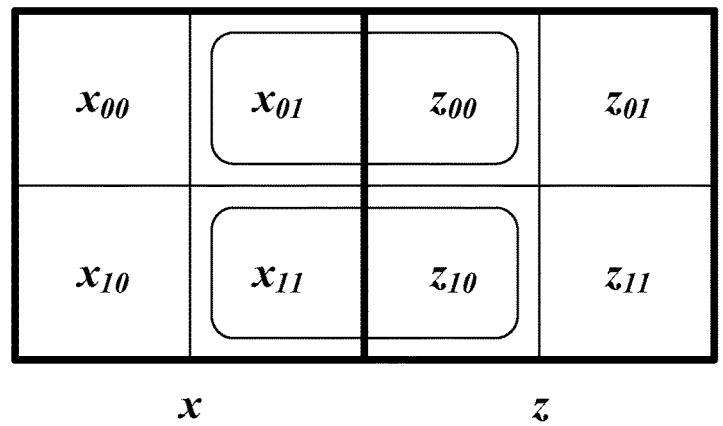
FIG. 7 illustrates an exemplary representation of differing resolutions used when evaluating a spatial consistency term $E^*_{spatial}$ of an objective function for two adjacent coarse-scale pixels, x and z.

FIG. 7 illustrates an exemplary representation of differing resolutions used when evaluating a spatial consistency term $E^*_{spatial}$ of an objective function for two adjacent coarse-scale pixels, x and z. A temporal consistency term $E^*_{temporal}$ can similarly be defined using a sum of fine-scale pixel differences on each block. Effectively, the optimizer component 120 can solve for loop parameters at a higher resolution (e.g., 960×540), but restricting the labels to have coarser (e.g., 2×2) spatial granularity. As shown in FIG. 7, the spatial consistency term of two adjacent course-scale pixels x and z can be the sum of the spatial consistency terms of their boundary-adjacent fine scale pixels. Thus, $\Psi(x,z)=\Psi(x_{01},z_{00})+\Psi(x_{11},z_{10})$. Moreover, note that $\Psi(x_{00}, x_{01})=\Psi(z_{00},z_{01})=0$ and $\Psi(x_{10},x_{11})=\Psi(z_{10},z_{11})=0$. Within the interior of each 2×2 block, spatial consistency is provided because the fine-scale pixels share the same label (e.g., period and start frame).

Again reference is made to FIG. 3. The interface component 116 can further include a streaming component 314. The streaming component 314 can enable multiple read streams to be read from the input video 104. Accordingly, the loop construction component 122 can assemble the output video loop 102 using multiple read streams on the input video 104. The multiple read streams on the input video can be used to read a portion of the input video into memory when creating a frame of the output video loop, while a remainder of the input video need not be memory-resident for creating such frame of the output video loop. The input video V 104 can be downsampled by the resampling component 308 as it is streamed in by the streaming component 314, and the output video loop 102 L' can be generated and compressed in a streaming fashion by the streaming component 314. The computations can involve downsampled data; however, the claimed subject matter is not so limited.

A memory bottleneck can be computation of the blended loop L'=L+Upsample($L_d$), because loop $L(x,t)=V(x,\varphi'(x,t))$ can rely on random-access to the full-resolution frames of the input video 104. For instance, the entire input video V 104 may be resident in memory for some conventional approaches.

However, due to the candidate labels being constrained to two dominant periods $p_1, p_2$ by the candidate detection component 312, the content used to generate L(•,t) comes from a limited number $\{k_1\}, \{k_2\}$ of input frames: $0 \le (t \mod p_1)+k_1p_1<T$ and $0 \le (t \mod p_2)+k_2p_2<T$. Therefore, an efficient solution can be to advance multiple simultaneous read streams on the input video V 104 by the streaming component 314, such that only these frames are memory-resident for each output frame t of the output video loop 102. Moreover, the read streams on the input video V 104 can proceed contiguously forward through the input video V 104 (possibly with exceptional occasional jumps).

Figure 8:
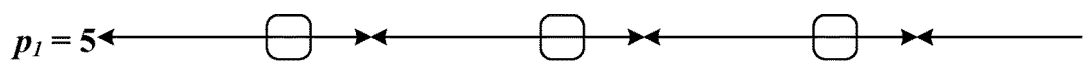
FIG. 8 illustrates an example of input frames of the input video V used to generate an output frame of the output video loop L.
Figure 8:

FIG. 8 depicts an example of input frames of the input video V used to generate an output frame of the output video loop L. As shown, since two candidate periods are used (e.g., $p_1=5$ and $p_2=8$), the content at any pixel x of the output frame t can be selected based on $(p_x,s_x)$ from a small number of input frames. In the illustrated example, output frame 13 only needs access to input frames 3, 5, 8, and 13. Further, the read streams can proceed contiguously forward such that, for example, output frame 14 may only need access to input frames 4, 5, 9, and 13 (e.g., assuming that input frame 13 is the static frame start frame).

FIG. 3 is again referenced. The blending component 304 can generate a Poisson blended loop L' at full resolution. The blending component 304 can solve for a difference $L_d$ rather than solving for L' itself, where $L_d=L'-L$. This approach can be extended to screened Poisson blending in which there is a preference to preserve the original colors in L. For instance, the following can be sought:

$$\min_{L'}\|\nabla L' - g\|^2 + \alpha\|L' - L\|^2.$$

An observation is that the desired gradient g can be expressed as a sparse difference $g_d$ from the gradient of an initial video loop L, $g=\nabla L+g_d$, since $g_d$ is nonzero along the spatiotemporal seams (e.g., at discontinuities of $\varphi'(x,t)$). Accordingly, the linear system can be represented as:

$$(\Delta-\alpha)(L+L_d)=\nabla\cdot(\nabla L+g_d)-\alpha L$$

The foregoing can be simplified as follows:

$$(\Delta-\alpha)L_d=\nabla\cdot g_d \quad (3)$$

Solving for the difference $L_d$ can be a screened Poisson equation, but now with a sparse right-hand side vector. Due to the sparsity, $L_d$ tends to be low-frequency except immediately adjacent to seams.

The blending component 304 can solve for Equation (3) on a coarser 3D grid $\overline{L}$. Further, the correction $\overline{L}_d$ can be upsampled by the resampling component 308 (e.g., using a box filter), and it can be added to the initial video loop L to obtain the blended loop L'. The temporal downsampling can lead to artifacts in part due to the non-uniform time steps in $\varphi'$ resulting from the local temporal scaling performed by the scaling component 302. Accordingly, course grids $\overline{L}$, $\overline{g}$, $\overline{L}_d$ can be created by downsampling spatially to the same spatial resolution as $\tilde{V}$.

The loop generation system 114 can provide a two-stage processing pipeline for the input video V 104: namely, the processing pipeline can include (1) determining looping parameters (e.g., performed by the parameter detection component 118) and (2) assembling a seamless Poisson blended loop (e.g., performed by the loop construction component 122). Many computations can operate on downsampled video. Per-pixel loop periods and start frames can be obtained by minimizing a consistency objective using a multi-label graph cut. Fidelity can be improved in this optimization by accessing detail from a next finer resolution. Subsequent Poisson blending can be anticipated by using a blend-aware objective E*, which spatially attenuates consistency based on a spatial blend mask. Classification of loopable pixels in the input video 104 can reduce the dimension of the search space. Identification of dominant periods can reduce a set of labels. Local temporal scaling can enable assembling an ordinary 5 second loop. Moreover, screened Poisson blending can remove spatial seams and temporal pops. The foregoing can involve gathering sparse gradient differences $g_d$ in the downsampled loop, solving a multi-grid Poisson problem, upsampling the resulting correction, and merging it with the initial high-resolution loop. Memory usage can be reduced further by opening multiple read streams on the input video 104.

Figure 9:
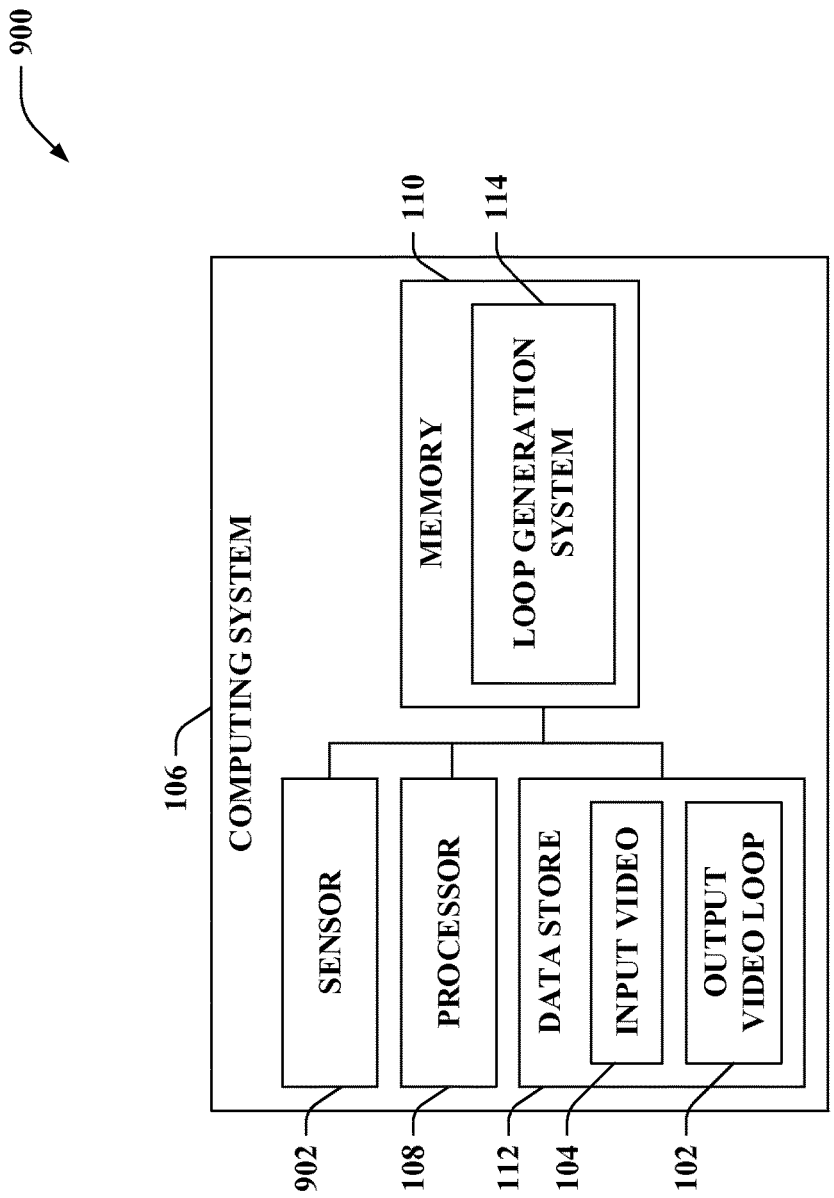
FIG. 9 illustrates a functional block diagram of another exemplary system that creates the output video loop based on the input video.

Now referring to FIG. 9, illustrated is another system 900 that creates the output video loop 102 based on the input video 104. The system 900 includes the computing system 106, which further includes the processor 108, the memory 110, and the data store 112. The memory 110 further includes the loop generation system 114. In the example depicted in FIG. 9, the computing system 106 further includes a sensor 902. The sensor 902 can capture the input video 104.

By way of illustration, the computing system 106 can be a mobile computing device, and the sensor 902 can be a camera of the mobile computing device. Following this illustration, the camera can capture the input video 104, which can be retained in the data store 112. Moreover, the loop generation system 114 of the mobile computing device can create the output video loop 102 based on the input video 104.

According to an example, the output video loop 102 can be automatically created by the loop generation system 114 in response to the sensor 902 capturing the input video 104 (e.g., without user input that causes the output video loop 102 to be created). For instance, a mode of operation of the computing system 106 can cause the output video loop 102 to be automatically created, automatic creation of the output video loop 102 can be a default capture technique implemented by the computing system 106, or the like. Pursuant to another example, the output video loop 102 can be created in response to user input, where the user input specifies to create the output video loop 102 from the input video 104.

Figure 10:
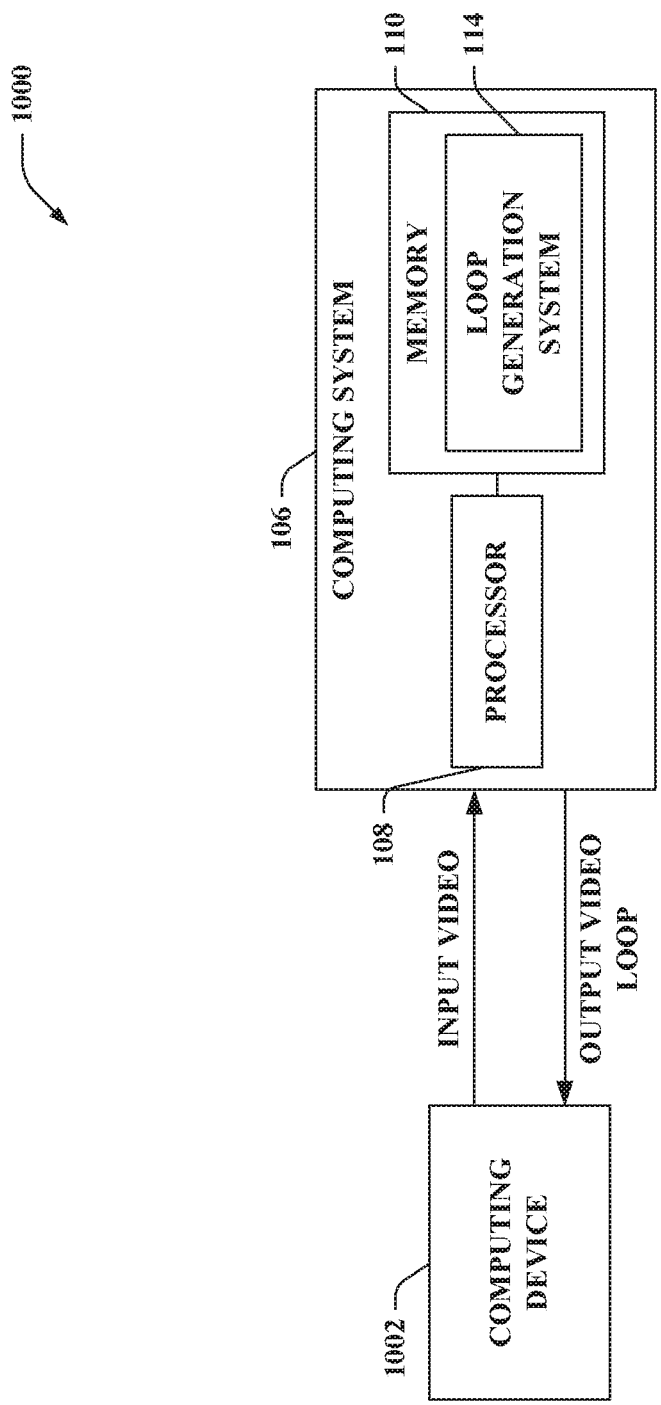
FIG. 10 illustrates a functional block diagram of another exemplary system that creates the output video loop based on the input video.

Turning to FIG. 10, illustrated is yet another system 1000 that creates an output video loop (e.g., the output video loop 102) based on an input video (e.g., the input video 104). The system 1000 includes the computing system 106 and a computing device 1002. The computing device 1002 can send the input video to the computing system 106. Thus, the computing system 106 can receive the input video from the computing device 1002. For instance, the computing device 1002 can capture the input video (e.g., the computing device 1002 can include a sensor that captures the input video); however, it is also contemplated that the computing device 1002 can receive the input video from a differing computing device (e.g., the differing computing device may capture the input video).

Although not shown, it is to be appreciated that the computing system 106 can include the data store 112, which can retain the input video. Moreover, the loop generation system 114 can create the output video loop based on the input video received from the computing device 1002. For example, the output video loop can be automatically created by the loop generation system 114 in response to receipt of the input video from the computing device 1002, created in response to user input, etc. The computing system 106 can further send the output video loop to the computing device 1002, send the output video loop to a computing device other than the computing device 1002, retain the output video loop in the data store, a combination thereof, and so forth.

Pursuant to an illustration, the computing system 106 of FIG. 10 can be part of a video storage service. Following this illustration, input videos can be uploaded to the service, and the service can return output video loops. For instance, input videos captured by the computing device 1002 can be automatically uploaded to the service (e.g., subject to privacy settings controlled by a user of the computing device 1002). The service can process the input videos to identify a subset of the input videos that would be appropriate for loop creation, and output video loops can be created for the identified subset of the input videos, for instance; however, it is contemplated that such identification need not be employed.

Generally referring to the computing system 106 described herein, it is contemplated that various operations set forth herein can be implemented using specialized hardware. For example, Poisson blending described herein as being performed by the blending component 304 can alternatively be performed using specialized hardware (e.g., a digital signal processor (DSP) configured to implement Poisson blending). However, the claimed subject matter is not so limited.

Figure 11:
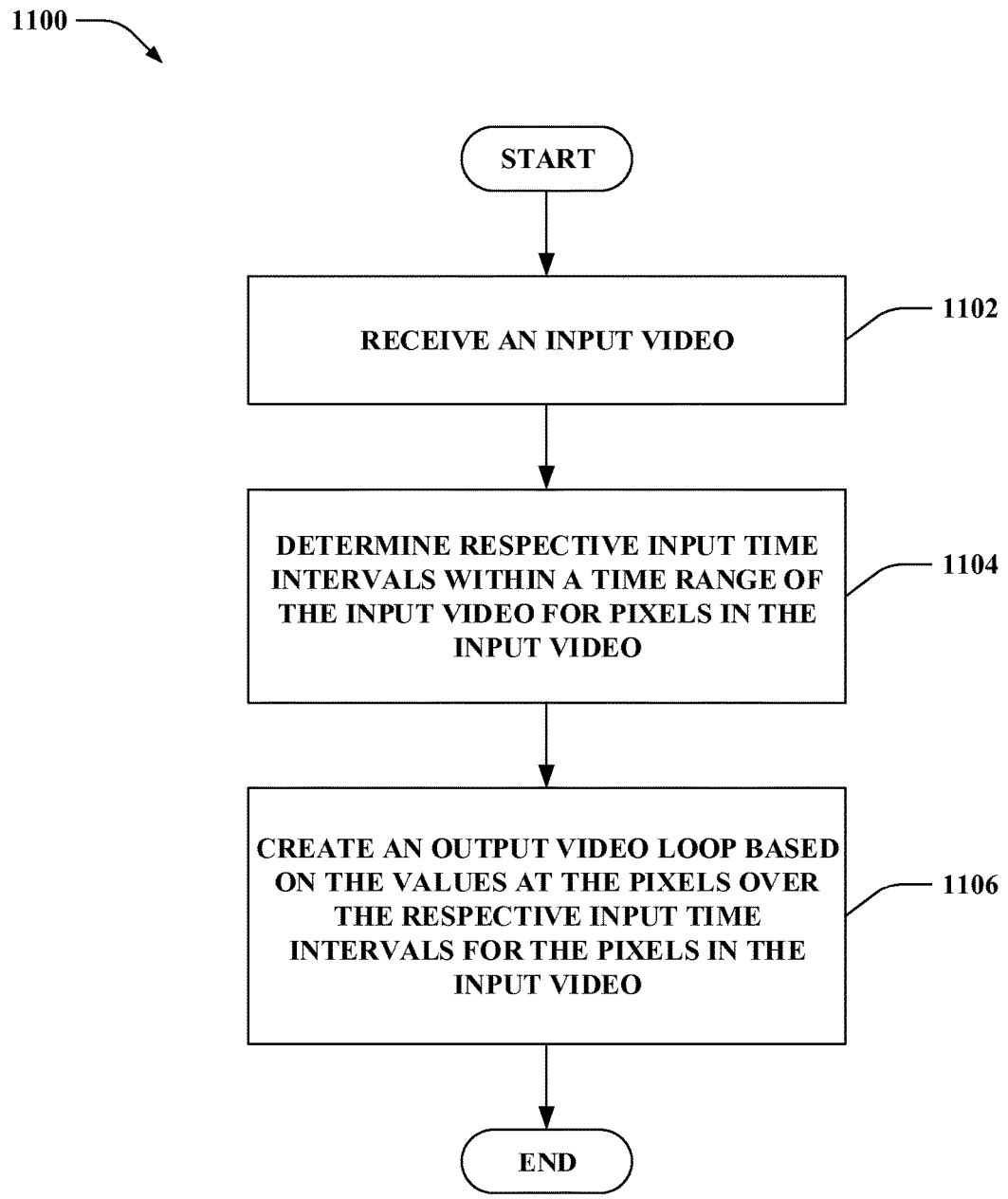
FIG. 11 is a flow diagram that illustrates an exemplary methodology for generating an output video loop.
Figure 12:
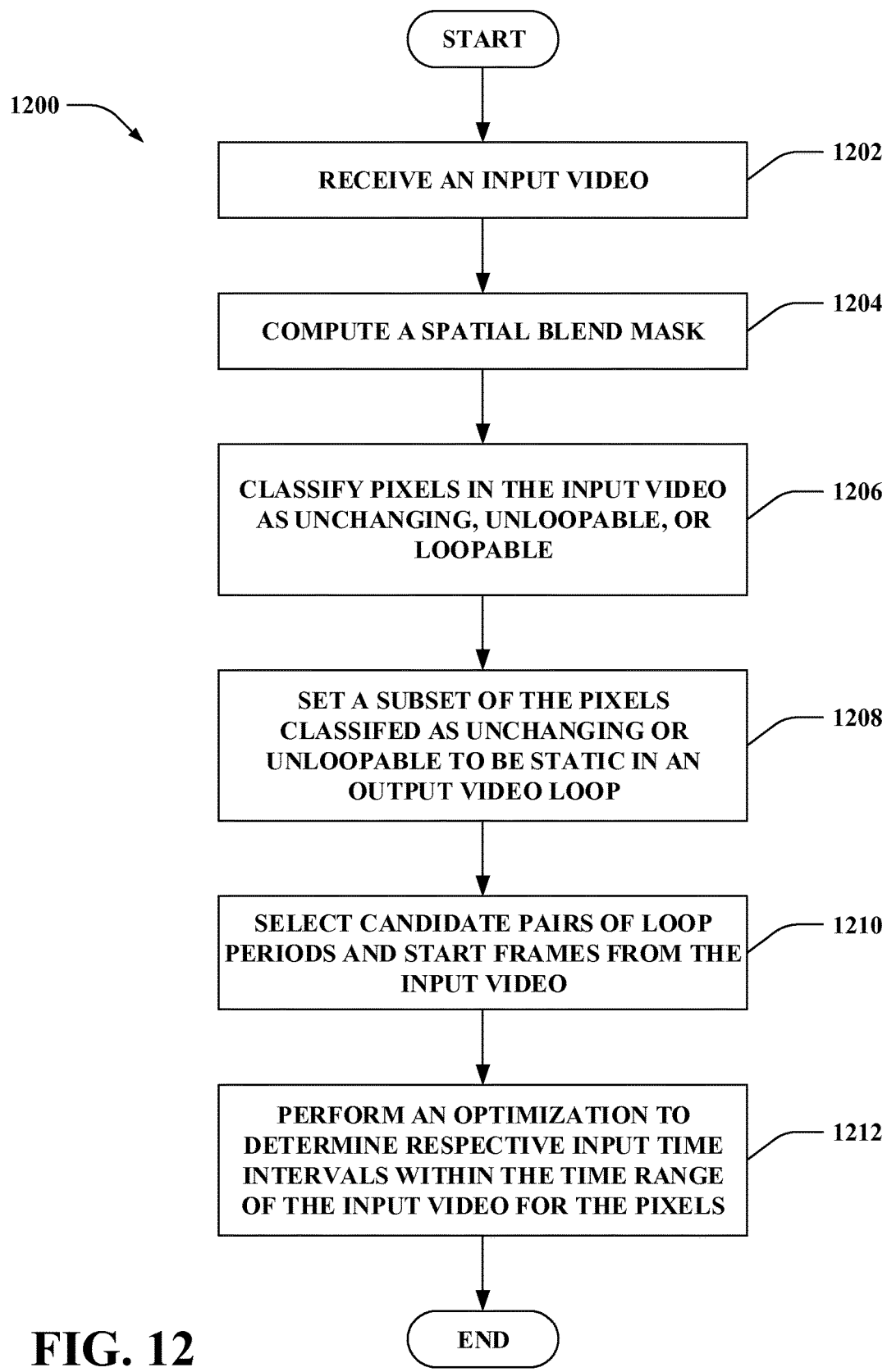
FIG. 12 is a flow diagram that illustrates an exemplary methodology for determining respective input time intervals (e.g., loop parameters) within a time range of an input video for pixels in the input video.

FIGS. 11-12 illustrate exemplary methodologies relating to generating an output video loop from an input video. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 11 illustrates a methodology 1100 for generating an output video loop. At 1102, an input video can be received. The input video includes values at pixels over a time range. At 1104, respective input time intervals within the time range of the input video can be determined for the pixels in the input video. An input time interval for a particular pixel includes a per-pixel loop period of a single, contiguous loop at the particular pixel within the time range from the input video. The input time interval for the particular pixel can further include a per-pixel start frame of the single, contiguous loop at the particular pixel within the time range from the input video. According to an example, an optimization of an objective function can be performed to determine the respective input time intervals, where the optimization is performed to assign the input time intervals to the pixels at a first level of resolution of the input video, terms of the objective function use a second level of resolution of the input video, and the first level of resolution is coarser than the second level of resolution. By way of another example, the respective input time intervals for the pixels can be temporally scaled based on the per-pixel loop periods and an output video loop period. At 1106, the output video loop can be created based on the values at the pixels over the respective input time intervals (e.g., as scaled if temporally scaled) for the pixels in the input video. The output video loop can be created at least in part by assembling the output video loop using multiple read streams on the input video, for example.

Now turning to FIG. 12, illustrated is a methodology 1200 for determining respective input time intervals (e.g., loop parameters) within a time range of an input video for pixels in the input video. At 1202, the input video can be received. The input video can be spatiotemporally downsampled, for instance. At 1204, a spatial blend mask can be computed. The spatial blend mask can include mask values indicative of ease of blending the pixels. At 1206, the pixels in the input video can be classified as unchanging, unloopable, or loopable. At 1208, a subset of the pixels classified as unchanging or unloopable can be set to be static in an output video loop. At 1210, candidate pairs of loop periods and start frames from the input video can be selected. Less than all possible pairs of the loop periods and the start frames from the input video can be selected as the candidate pairs. At 1212, an optimization can be performed to determine the respective input time intervals within the time range of the input video for the pixels. The optimization can be performed using an objective function that includes a spatial consistency term and a temporal consistency term, where the spatial consistency term and the temporal consistency term can be modulated by the spatial blend mask. Moreover, the optimization can be performed to determine the respective input time intervals for the pixels classified as loopable (e.g., the optimization need not be performed for the pixels classified as unchanging or unloopable). Further, the respective input time intervals determined for the pixels can be selected from the candidate pairs of the loop periods and the start frames.

Figure 13:
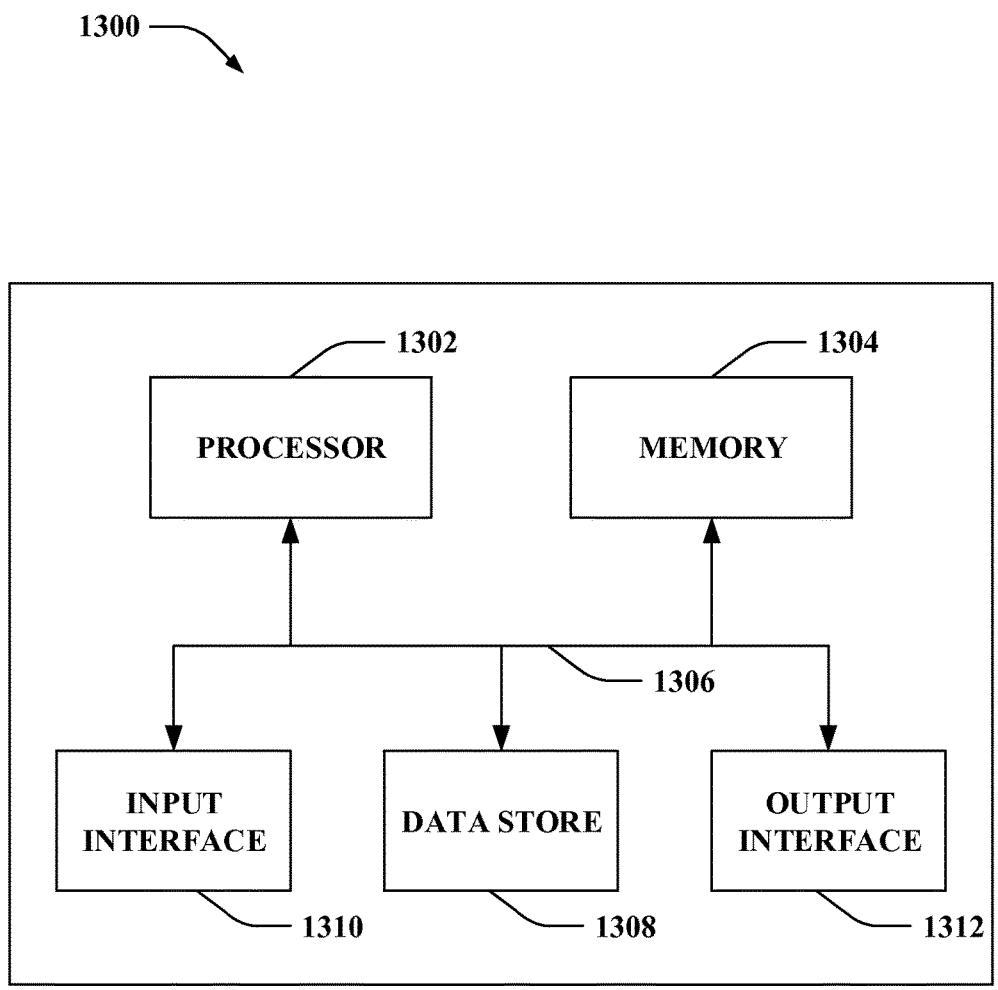
FIG. 13 illustrates an exemplary computing device.

Referring now to FIG. 13, a high-level illustration of an exemplary computing device 1300 that can be used in accordance with the systems and methodologies disclosed herein is illustrated. For instance, the computing device 1300 may be used in a system that generates an output video loop from an input video. Additionally or alternatively, the computing device 1300 may be used to capture an input video. The computing device 1300 includes at least one processor 1302 that executes instructions that are stored in a memory 1304. The instructions may be, for instance, instructions for implementing functionality described as being carried out by one or more components discussed above or instructions for implementing one or more of the methods described above. The processor 1302 may access the memory 1304 by way of a system bus 1306. In addition to storing executable instructions, the memory 1304 may also store an input video, an output video loop, loop parameters, and so forth.

The computing device 1300 additionally includes a data store 1308 that is accessible by the processor 1302 by way of the system bus 1306. The data store 1308 may include executable instructions, an input video, an output video loop, etc. The computing device 1300 also includes an input interface 1310 that allows external devices to communicate with the computing device 1300. For instance, the input interface 1310 may be used to receive instructions from an external computer device, from a user, etc. The computing device 1300 also includes an output interface 1312 that interfaces the computing device 1300 with one or more external devices. For example, the computing device 1300 may display text, images, etc. by way of the output interface 1312.

It is contemplated that the external devices that communicate with the computing device 1300 via the input interface 1310 and the output interface 1312 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1300 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1300 may be a distributed system. Thus, for instance, several devices may be in communication by way of a network connection and may collectively perform tasks described as being performed by the computing device 1300.

Figure 14:
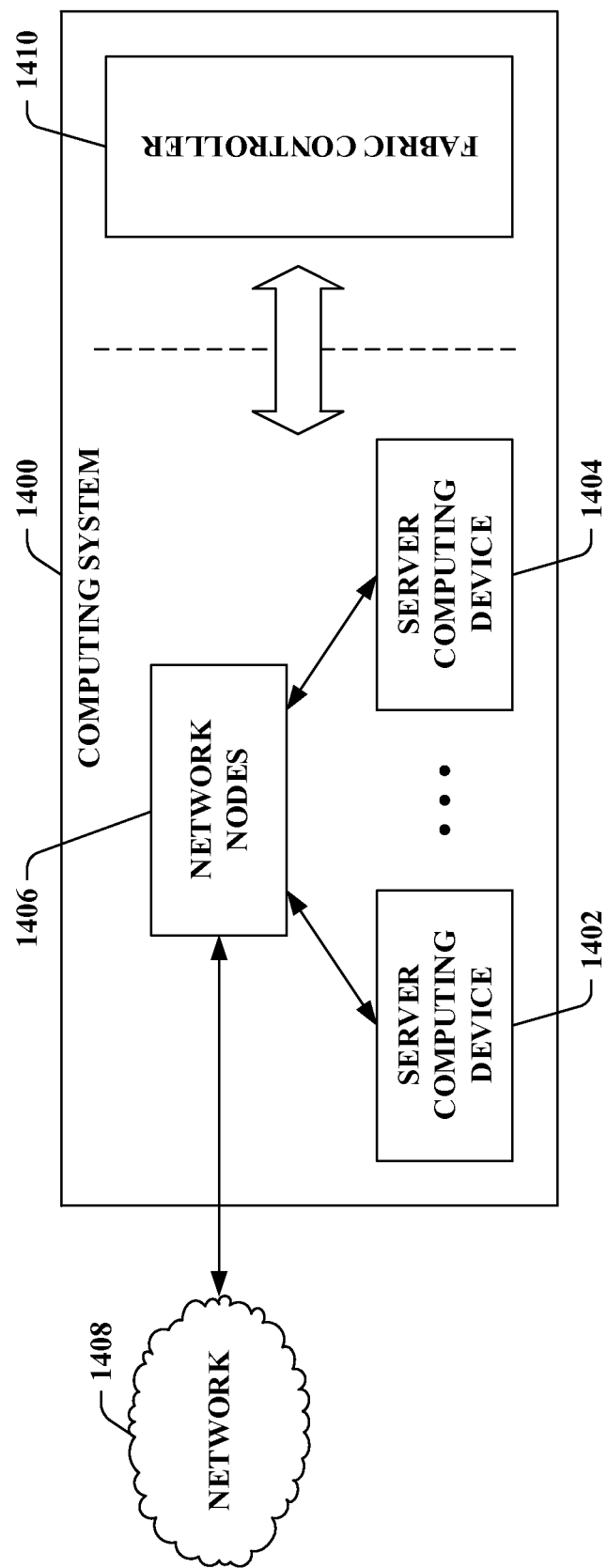
FIG. 14 illustrates an exemplary computing system.

Turning to FIG. 14, a high-level illustration of an exemplary computing system 1400 that can be used in accordance with the systems and methodologies disclosed herein is illustrated. For instance, the computing system 1400 can be or include the computing system 106. Additionally or alternatively, the computing system 106 can be or include the computing system 1400.

The computing system 1400 includes a plurality of server computing devices, namely, a server computing device 1402, . . . , and a server computing device 1404 (collectively referred to as server computing devices 1402-1404). The server computing device 1402 includes at least one processor and a memory; the at least one processor executes instructions that are stored in the memory. The instructions may be, for instance, instructions for implementing functionality described as being carried out by one or more components discussed above or instructions for implementing one or more of the methods described above. Similar to the server computing device 1402, at least a subset of the server computing devices 1402-1404 other than the server computing device 1402 each respectively include at least one processor and a memory. Moreover, at least a subset of the server computing devices 1402-1404 include respective data stores.

Processor(s) of one or more of the server computing devices 1402-1404 can be or include the processor 108. Further, a memory (or memories) of one or more of the server computing devices 1402-1404 can be or include the memory 110. Moreover, a data store (or data stores) of one or more of the server computing devices 1402-1404 can be or include the data store 112.

The computing system 1400 further includes various network nodes 1406 that transport data between the server computing devices 1402-1404. Moreover, the network nodes 1402 transport data from the server computing devices 1402-1404 to external nodes (e.g., external to the computing system 1400) by way of a network 1408. The network nodes 1402 also transport data to the server computing devices 1402-1404 from the external nodes by way of the network 1408. The network 1408, for example, can be the Internet, a cellular network, or the like. The network nodes 1406 include switches, routers, load balancers, and so forth.

A fabric controller 1410 of the computing system 1400 manages hardware resources of the server computing devices 1402-1404 (e.g., processors, memories, data stores, etc. of the server computing devices 1402-1404). The fabric controller 1410 further manages the network nodes 1406. Moreover, the fabric controller 1410 manages creation, provisioning, de-provisioning, and supervising of virtual machines instantiated upon the server computing devices 1402-1404.

Various examples are now set forth.

Example 1

A method of generating an output video loop, comprising: receiving an input video, the input video comprises values at pixels over a time range; determining respective input time intervals within the time range of the input video for the pixels in the input video, an input time interval for a particular pixel comprises a per-pixel loop period of a single, contiguous loop at the particular pixel within the time range from the input video; temporally scaling the respective input time intervals for the pixels based on per-pixel loop periods and an output video loop period; and creating the output video loop having the output video loop period based on the values at the pixels over the respective input time intervals as scaled for the pixels in the input video.

Example 2

The method according to Example 1, the input time interval for the particular pixel further comprises a per-pixel start frame of the single, contiguous loop at the particular pixel within the time range from the input video.

Example 3

The method according to any of Examples 1-2, determining the respective input time intervals within the time range of the input video for the pixels in the input video further comprises: computing a spatial blend mask, the spatial blend mask comprises mask values indicative of ease of blending the pixels; and determining the respective input time intervals within the time range of the input video for the pixels that optimize an objective function, the objective function comprises a spatial consistency term and a temporal consistency term, and the spatial consistency term and the temporal consistency term are modulated by the spatial blend mask.

Example 4

The method according to Example 3, creating the output video loop further comprises: assembling an initial video loop based on the values at the pixels over the respective input time intervals as scaled for the pixels in the input video; and applying Poisson blending to generate the output video loop based on the initial video loop.

Example 5

The method according to any of Examples 1-4, further comprising: classifying the pixels in the input video as unchanging, unloopable, or loopable; setting a subset of the pixels classified as unchanging or unloopable to be static in the output video loop; and performing an optimization to determine the respective input time intervals within the time range of the input video for a remainder of the pixels classified as loopable.

Example 6

The method according to any of Examples 1-5, further comprising: selecting candidate pairs of loop periods and start frames from the input video, wherein less than all possible pairs of the loop periods and the start frames from the input video are selected as the candidate pairs; and determining the respective input time intervals within the time range of the input video for the pixels in the input video from the candidate pairs of the loop periods and the start frames.

Example 7

The method according to Example 6, further comprising selecting the candidate pairs of the loop periods and the start frames from the input video based on temporal costs for the loop periods, the temporal costs being based on differences between frame pairs separated by the loop periods in the input video.

Example 8

The method according to any of Examples 6-7, the candidate pairs of the loop periods and the start frames comprise a static frame having a unity loop period, the static frame being selected based on two or more of the candidate pairs other than the static frame.

Example 9

The method according to any of Examples 1-8, creating the output video loop further comprises assembling the output video loop using multiple read streams on the input video.

Example 10

The method according to any of Examples 1-9, further comprising performing an optimization of an objective function to determine the respective input time intervals within the time range of the input video for the pixels in the input video, the optimization being performed to assign the respective input time intervals to the pixels at a first level of resolution of the input video, terms of the objective function using a second level of resolution of the input video, and the first level of resolution being coarser than the second level of resolution.

Example 11

The method according to any of Examples 1-10, the per-pixel loop period for the particular pixel being a unity per-pixel loop period, and the particular pixel being static in the output video loop.

Example 12

A computing system, comprising: at least one processor; and memory that comprises computer-executable instructions that, when executed by the at least one processor, cause the at least one processor to perform acts including: receiving an input video, the input video comprises values at pixels over a time range; performing an optimization of an objective function to determine respective input time intervals within the time range of the input video for the pixels in the input video, an input time interval for a particular pixel comprises a per-pixel loop period of a single, contiguous loop at the particular pixel within the time range from the input video, the optimization being performed to assign the respective input time intervals to the pixels at a first level of resolution of the input video, terms of the objective function using a second level of resolution of the input video, and the first level of resolution being coarser than the second level of resolution; and creating an output video loop based on the values at the pixels over the respective input time intervals for the pixels in the input video.

Example 13

The computing system according to Example 12, the memory further comprising computer-executable instructions that, when executed by the at least one processor, cause the at least one processor to perform acts including: temporally scaling the respective input time intervals for the pixels based on per-pixel loop periods and an output video loop period, the output video having the output video loop period being created based on the values at the pixels over the respective input time intervals as scaled for the pixels in the input video.

Example 14

The computing system according to any of Examples 12-13, the memory further comprising computer-executable instructions that, when executed by the at least one processor, cause the at least one processor to perform acts including: assembling the output video loop using multiple read streams on the input video as part of creating the output video loop.

Example 15

The computing system according to any of Examples 12-14, the memory further comprising computer-executable instructions that, when executed by the at least one processor, cause the at least one processor to perform acts including: computing a spatial blend mask, the spatial blend mask comprises mask values indicative of ease of blending the pixels; determining the respective input time intervals within the time range of the input video for the pixels that optimize the objective function, the objective function comprises a spatial consistency term and a temporal consistency term, and the spatial consistency term and the temporal consistency term are modulated by the spatial blend mask; assembling an initial video loop based on the values at the pixels over the respective input time intervals for the pixels in the input video; and applying Poisson blending to generate the output video loop based on the initial video loop.

Example 16

The computing system according to any of Examples 12-15, further comprising a sensor that captures the input video.

Example 17

The computing system according to any of Examples 12-15, the input video being received from a computing device.

Example 18

A computing system, comprising: at least one processor; and memory that comprises computer-executable instructions that, when executed by the at least one processor, cause the at least one processor to perform acts including: receiving an input video, the input video comprises values at pixels over a time range; performing an optimization of an objective function to determine respective input time intervals within the time range of the input video for the pixels in the input video, an input time interval for a particular pixel comprises a per-pixel loop period of a single, contiguous loop at the particular pixel within the time range from the input video; and creating an output video loop based on the values at the pixels over the respective input time intervals for the pixels in the input video, the output video loop being created at least in part by assembling the output video loop using multiple read streams on the input video.

Example 19

The computing system according to Example 18, the memory further comprising computer-executable instructions that, when executed by the at least one processor, cause the at least one processor to perform acts including: temporally scaling the respective input time intervals for the pixels based on per-pixel loop periods and an output video loop period, the output video having the output video loop period being created based on the values at the pixels over the respective input time intervals as scaled for the pixels in the input video.

Example 20

The computing system according to any of Examples 18-19, the memory further comprising computer-executable instructions that, when executed by the at least one processor, cause the at least one processor to perform acts including: performing the optimization to assign the respective input time intervals to the pixels at a first level of resolution of the input video, terms of the objective function using a second level of resolution of the input video, and the first level of resolution being coarser than the second level of resolution.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of generating an output video loop, comprising:
    receiving an input video, the input video comprises values at pixels over a time range;
    determining respective input time intervals within the time range of the input video for the pixels in the input video, an input time interval for a particular pixel comprises a per-pixel loop period of a single, contiguous loop at the particular pixel within the time range from the input video;
    temporally scaling the respective input time intervals for the pixels based on per-pixel loop periods and an output video loop period; and
    creating the output video loop having the output video loop period based on the values at the pixels over the respective input time intervals as scaled for the pixels in the input video.

2. The method of claim 1, the input time interval for the particular pixel further comprises a per-pixel start frame of the single, contiguous loop at the particular pixel within the time range from the input video.

3. The method of claim 1, determining the respective input time intervals within the time range of the input video for the pixels in the input video further comprises:
    computing a spatial blend mask, the spatial blend mask comprises mask values indicative of ease of blending the pixels; and determining the respective input time intervals within the time range of the input video for the pixels that optimize an objective function, the objective function comprises a spatial consistency term and a temporal consistency term, and the spatial consistency term and the temporal consistency term are modulated by the spatial blend mask.

4. The method of claim 3, creating the output video loop further comprises:
assembling an initial video loop based on the values at the pixels over the respective input time intervals as scaled for the pixels in the input video; and
applying Poisson blending to generate the output video loop based on the initial video loop.

5. The method of claim 1, further comprising:
classifying the pixels in the input video as unchanging, unloopable, or loopable;
setting a subset of the pixels classified as unchanging or unloopable to be static in the output video loop; and
performing an optimization to determine the respective input time intervals within the time range of the input video for a remainder of the pixels classified as loopable.

6. The method of claim 1, further comprising:
selecting candidate pairs of loop periods and start frames from the input video, wherein less than all possible pairs of the loop periods and the start frames from the input video are selected as the candidate pairs; and
determining the respective input time intervals within the time range of the input video for the pixels in the input video from the candidate pairs of the loop periods and the start frames.

7. The method of claim 6, further comprising selecting the candidate pairs of the loop periods and the start frames from the input video based on temporal costs for the loop periods, the temporal costs being based on differences between frame pairs separated by the loop periods in the input video.

8. The method of claim 6, the candidate pairs of the loop periods and the start frames comprise a static frame having a unity loop period, the static frame being selected based on two or more of the candidate pairs other than the static frame.

9. The method of claim 1, creating the output video loop further comprises assembling the output video loop using multiple read streams on the input video.

10. The method of claim 1, further comprising performing an optimization of an objective function to determine the respective input time intervals within the time range of the input video for the pixels in the input video, the optimization being performed to assign the respective input time intervals to the pixels at a first level of resolution of the input video, terms of the objective function using a second level of resolution of the input video, and the first level of resolution being coarser than the second level of resolution.

11. The method of claim 1, the per-pixel loop period for the particular pixel being a unity per-pixel loop period, and the particular pixel being static in the output video loop.

12. A computing system, comprising:
at least one processor; and
memory that comprises computer-executable instructions that, when executed by the at least one processor, cause the at least one processor to perform acts including:
receiving an input video, the input video comprises values at pixels over a time range;
determining respective input time intervals within the time range of the input video for the pixels in the input video, an input time interval for a particular pixel comprises a per-pixel loop period of a single, contiguous loop at the particular pixel within the time range from the input video;
temporally scaling the respective input time intervals for the pixels based on per-pixel loop periods and an output video loop period; and
creating the output video loop having the output video loop period based on the values at the pixels over the respective input time intervals as scaled for the pixels in the input video.

13. The computing system of claim 12, the input time interval for the particular pixel further comprises a per-pixel start frame of the single, contiguous loop at the particular pixel within the time range from the input video.

14. The computing system of claim 12, determining the respective input time intervals within the time range of the input video for the pixels in the input video further comprises:
computing a spatial blend mask, the spatial blend mask comprises mask values indicative of ease of blending the pixels; and
determining the respective input time intervals within the time range of the input video for the pixels that optimize an objective function, the objective function comprises a spatial consistency term and a temporal consistency term, and the spatial consistency term and the temporal consistency term are modulated by the spatial blend mask.

15. The computing system of claim 12, the memory further comprising computer-executable instructions that, when executed by the at least one processor, cause the at least one processor to perform acts including:
classifying the pixels in the input video as unchanging, unloopable, or loopable;
setting a subset of the pixels classified as unchanging or unloopable to be static in the output video loop; and
performing an optimization to determine the respective input time intervals within the time range of the input video for a remainder of the pixels classified as loopable.

16. The computing system of claim 12, the memory further comprising computer-executable instructions that, when executed by the at least one processor, cause the at least one processor to perform acts including:
selecting candidate pairs of loop periods and start frames from the input video, wherein less than all possible pairs of the loop periods and the start frames from the input video are selected as the candidate pairs; and
determining the respective input time intervals within the time range of the input video for the pixels in the input video from the candidate pairs of the loop periods and the start frames.

17. The computing system of claim 12, creating the output video loop further comprises assembling the output video loop using multiple read streams on the input video.

18. The computing system of claim 12, the memory further comprising computer-executable instructions that, when executed by the at least one processor, cause the at least one processor to perform acts including:
performing an optimization of an objective function to determine the respective input time intervals within the time range of the input video for the pixels in the input video, the optimization being performed to assign the respective input time intervals to the pixels at a first level of resolution of the input video, terms of the objective function using a second level of resolution of the input video, and the first level of resolution being coarser than the second level of resolution.

19. The computing system of claim 12, the per-pixel loop period for the particular pixel being a unity per-pixel loop period, and the particular pixel being static in the output video loop.

20. A computer-readable storage device comprising computer-executable instructions which when executed cause at least one processor of a computing device to:
receive an input video, the input video comprises values at pixels over a time range;
determine respective input time intervals within the time range of the input video for the pixels in the input video, an input time interval for a particular pixel comprises a per-pixel loop period of a single, contiguous loop at the particular pixel within the time range from the input video;
temporally scale the respective input time intervals for the pixels based on per-pixel loop periods and an output video loop period; and
create the output video loop having the output video loop period based on the values at the pixels over the respective input time intervals as scaled for the pixels in the input video.

* * * * *